United States Patent
Marcovich et al.

(10) Patent No.: US 11,951,693 B2
(45) Date of Patent: Apr. 9, 2024

(54) METHOD FOR REINFORCING A PANEL AND A METHOD FOR MANUFACTURING A COMPOSITE PANEL IMPLEMENTING SUCH A METHOD

(71) Applicants: SOCIETE INTERNATIONALE POUR LE COMMERCE ET L'INDUSTRIE, Chateauneuf les Martigues (FR); ASCODERO PRODUCTIQUE, Bray-sur-Somme (FR)

(72) Inventors: Philippe Marcovich, Chateauneuf les Martigues (FR); Philippe Sajet, Bray-sur-Somme (FR); Xavier Couvreur, Bray-sur-Somme (FR); Charles Lestoquoy, Groffliers (FR); Cyril Laine, Chateauneuf les Martigues (FR)

(73) Assignees: SOCIETE INTERNATIONALE POUR LE COMMERCE ET L'INDUSTRIE, Chateauneuf les Martigues (FR); ASCODERO PRODUCTIQUE, Bray-sur-Somme (FR)

( * ) Notice: Subject to any disclaimer, the term of this patent is extended or adjusted under 35 U.S.C. 154(b) by 170 days.

(21) Appl. No.: 17/624,789

(22) PCT Filed: Jul. 8, 2020

(86) PCT No.: PCT/EP2020/069244
§ 371 (c)(1),
(2) Date: Jan. 4, 2022

(87) PCT Pub. No.: WO2021/005107
PCT Pub. Date: Jan. 14, 2021

(65) Prior Publication Data
US 2022/0250336 A1    Aug. 11, 2022

(30) Foreign Application Priority Data

Jul. 8, 2019    (FR) .................................... 19 07623

(51) Int. Cl.
*B29C 70/24* (2006.01)
*B29C 70/08* (2006.01)

(52) U.S. Cl.
CPC ............ *B29C 70/24* (2013.01); *B29C 70/086* (2013.01)

(58) Field of Classification Search
CPC .............................. B29C 70/24; B29C 70/086
(Continued)

(56) References Cited

U.S. PATENT DOCUMENTS

2008/0226876 A1 *   9/2008   Roth ................... B29C 70/24
                                                156/256

FOREIGN PATENT DOCUMENTS

EP    1883526 A1    2/2008
EP    3173216 A1    5/2017
(Continued)

OTHER PUBLICATIONS

Machine_English_translation_FR_3029834_A1; Doyen et al.; Method for Inserting and Placing Individual Wires Through a Panel Jun. 17, 2016; EP; whole document (Year: 2023).*

(Continued)

*Primary Examiner* — Tahseen Khan
(74) *Attorney, Agent, or Firm* — Maier & Maier, PLLC

(57) ABSTRACT

A method for reinforcing a panel according to its thickness, including: a step a) of providing a reinforcing element which is elongated, flexible, with two longitudinal ends having a length strictly greater than twice the thickness of the panel; a step b) of positioning and holding the reinforcing element on one side of the panel, called the insertion side; a step c)

(Continued)

of gripping the reinforcing element, in its middle, on the insertion side, an insertion step d) wherein the reinforcing element gripped by its middle is pulled through a bore passing through the panel, by folding the reinforcing element back on itself, and to a final position, wherein the two longitudinal ends project or not from the bore on the insertion side, a loop of the reinforcing element projecting or not from the bore on the side of the panel opposite to the insertion side.

20 Claims, 10 Drawing Sheets

(58) Field of Classification Search
USPC .......................................... 428/218
See application file for complete search history.

(56) References Cited

FOREIGN PATENT DOCUMENTS

| FR | 3029834 A1 | * | 6/2016 | ............. B29C 70/24 |
| FR | 3029834 A1 | | 6/2016 | |
| WO | 9200845 A1 | | 1/1992 | |
| WO | 2006125562 A1 | | 11/2006 | |
| WO | 2017202669 A1 | | 11/2017 | |

OTHER PUBLICATIONS

International Search Report dated Oct. 9, 2020, in corresponding International Application PCT/EP2020/069244; 5 pages (with English Translation).

* cited by examiner

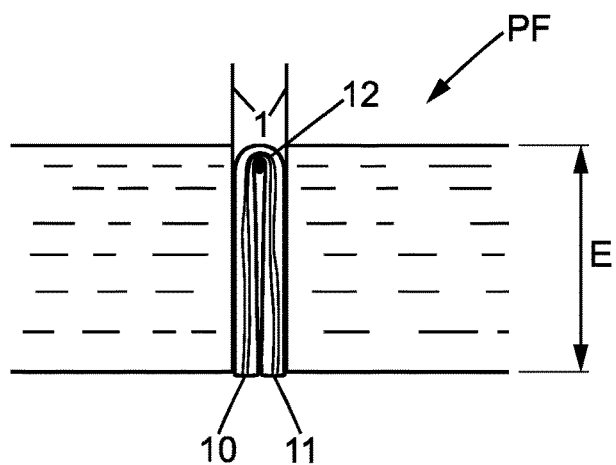
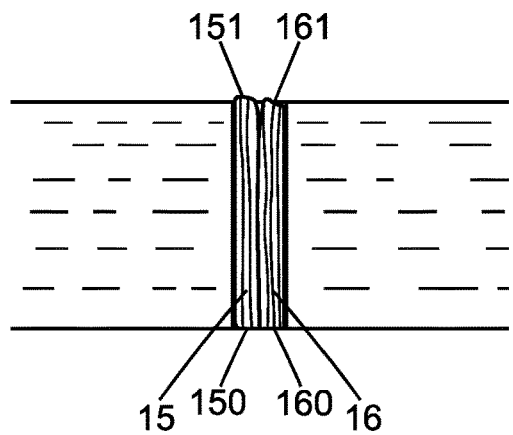
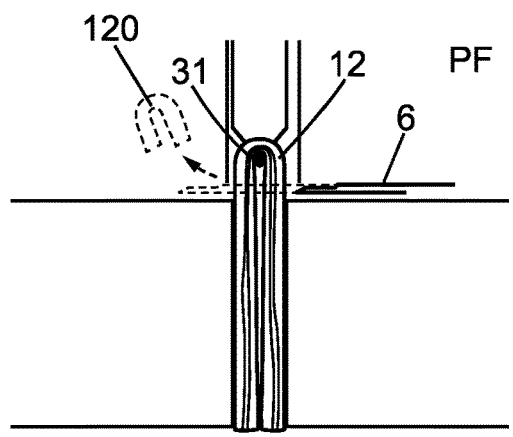

METHOD FOR REINFORCING A PANEL AND A METHOD FOR MANUFACTURING A COMPOSITE PANEL IMPLEMENTING SUCH A METHOD

FIELD

The invention relates to a method for reinforcing a panel according to its thickness, as well as a method for manufacturing composite panels using such a panel reinforcement method.

The present disclosure relates to the field of the manufacture of composite sandwiches, also called composite panels. A composite sandwich substantially comprises three elements which are superimposed, flat, or 3D preformed, depending on its thickness, namely two skins and an interlayer core material, conventionally in the shape of a panel which is flat or 3D preformed, intimately bonded to the two skins. In the context of the present disclosure, the core material reinforced by the insertion of one (or more) reinforcing element(s) can be, by way of non-limiting example, a panel of cellular foam such as polyethylene foams (PE), polyethylene terephthalate (PET) foams, polyurethane (PUR) foams, acrylic foams (PMI), bio-sourced foams, and also various materials such as cork for example. The skins are conventionally textiles, namely different materials woven in different weaves (twill or satin, for example), or else unidirectional or multiaxial fabrics.

The invention relates more particularly to the field of composite sandwiches, the mechanical performances of which are improved by the addition of fibrous reinforcements passing through the direction of the thickness of the core, namely in a direction perpendicular to a mean plane (or mean surface) between the two external surfaces of the panel, at the insertion point, or else in a direction inclined relative to this direction, perpendicular to the mean plane (or to the mean surface).

In such a prior art, and according to a first possibility of transformation called "vacuum infusion molding", or more simply "infusion", resin is applied to the skin/core material preform: in a vacuum mold, the fibrous reinforcements being impregnated with the arrival of resin which is sucked by the vacuum created in the mold: once polymerized, this resin ensures the securing between the skin/core material interfaces, and coats the fibers spared in perforations according to the thickness of the core, thus obtaining the composite reinforcements.

The reinforcement method according to the present disclosure is compatible with this first possibility of transformation.

The reinforcement method according to the present disclosure is however not limited to this first possibility of transformation. For example, as another possible embodiment, and according to a second possibility of transformation, the reinforcing fibers of the skins and the reinforcing fibers of the reinforcing elements can be mixed with thermoplastic fibers. The skin/core material assembly is heated to melt the thermoplastic fibers of the skin and the reinforcing elements, and until the sandwich is obtained, after polymerization.

BACKGROUND

The prior art of composite sandwiches knows reinforcement techniques by inserting flexible yarns on the skin/core preform. Known yarn insertion techniques are stitching operations through the three materials of the skin/core preform: the fibrous reinforcements of the same line are obtained by working with the same stitching needle which periodically inserts a continuous yarn according to the thickness of the core. To make the next line of reinforcements, the panel is advanced one pitch and the needle proceeds with a new cycle of stitching on an adjacent line.

Reinforcement techniques are also known for which the fibrous reinforcements are obtained and inserted by needling techniques. In such a technique, a series of needles provided with barbs are used to pull fibers along the thickness of the core. Conventionally, the pulled fibers can come from one of the skins, or else from a fiber web disposed on one of the two surfaces of the panel.

The main drawback of stitching reinforcement techniques is their very long implementation due to the work of the needle, and unlike the needling reinforcement techniques which are at a higher rate.

Conversely, the main drawback in needling techniques is their random nature in the sense that it cannot be guaranteed that the barbs of the needles actually pull the fibers: in such a case a quantified presence of the fibrous reinforcements in the panel cannot be guaranteed, and unlike the techniques of reinforcement by stitching.

In both cases, these techniques have the additional drawback of not allowing any distribution of the fibrous reinforcements in the core material, or even any inclination of the reinforcements, and due to the techniques and stitching (or needling) equipment used to insert these fibrous reinforcements into the panel of the core material.

Also known from document FR 3.029.834 is a technique for inserting individual yarns; which comprises the following steps:
  providing a panel, as well as a longitudinal insertion element having a free end,
  providing a yarn spool and unwinding a length section of the yarn along and in the vicinity of the panel, disposed on the first side (of the panel),
  perforating the panel with said insertion element, by moving said insertion element along its longitudinal axis, from said first side of the panel and through the panel, and simultaneously the yarn is carried by a pushing action of said insertion element on the yarn, at the free end of said element, and until said insertion element and the yarn emerge from the second side of the panel and so as to lay out through the perforation of the panel thus created, an upstream strand and a downstream strand with reference to a loop of the yarn emerging from the second side of the panel,
  cutting the yarn at the upstream strand, on the first side of the panel, and at the loop on the second side of the panel, obtaining a pair of individual yarns through the perforation of the panel, made up of the upstream and downstream strands.

According to the findings of the inventors, such a method allows to ensure the presence of an individual reinforcing element formed by two strands of yarns. On the other hand, this method according to FR 3029834 can be improved in that the section of the reinforcing element is undersized relative to the perforated bore. In other words, such a method does not allow to ensure a sufficient amount of fibers in the reinforcing bridges.

Also known from document US2008/0226876A1 is a method for reinforcing a composite panel comprising a core and textile skins with the implementation of the following steps:
  simultaneously piercing the panel and the skins by creating a bore, by inserting a tool with clamp, gripping the longitudinal end of a reinforcing element by the clamp, pulling the reinforcing element, through the bore until the ends of the reinforcing element project from the two skins.

According to the findings of the inventors, such a method according to US2008/0226876A1 ensuring the insertion of a reinforcing element by pulling its longitudinal end, is unreliable, in particular if there is significant friction between the reinforcing element and the panel in the bore during insertion. According to the findings of the inventors, such a method does not allow the reliable, automated and industrial insertion of a textile reinforcement, while minimizing the clearance between the perforated bore and the textile reinforcing element.

Also known from documents US.3030.256 B1, WO2006/125562 or else EP 3.173.216 A1 is a method for manufacturing a reinforced cellular material comprising the steps of:

producing a through hole in the cellular material which extends from a first surface of the cellular material to a second surface of the cellular material, preparing at least one bundle of fibers on the other side of the second surface of the cellular material, passing through the through hole from the first surface in order to grip the at least one bundle of fibers, and pulling the at least one bundle of fibers through the through hole in the cellular material.

In these three references US.3030.256 B1, WO2006/125562 and EP 3.173.216 A1, the tool used for piercing the hole, and the tool allowing the grip for pulling the bundle of fibers is the same tool consisting of a needle provided with a hook at its end. The hook of the needle grips the bundle of fibers, and pulls it forming a loop.

As explained in page 7 of application WO2006/125562, or also in paragraph 14 of document EP 3.173.216 A1, the section of the needle is deliberately chosen as small as possible, in particular so that the hole produced is of section smaller than the diameter of the bundle of fibers pulled through the hole.

According to the tests carried out by the inventors, the use of a needle as a piercing tool generates problems the intensity of the disadvantages of which increases with the increase in the section (or diameter) of the needle used and in particular:

a risk of tearing of the cellular material which increases according to the section of the needle, due to the work of the needle and the stresses applied by the needle to the material, in particular when the needle emerges from the cellular material, the hole formed by the needle being obtained by piercing and deforming the cellular material (without removing material), this piercing locally modifies the density of the cellular material at the holes, with a compression of the material in the vicinity of the hole compared to the cellular material located further from a hole, compression which may moreover not be constant depending on the thickness of the cellular material, and again, the local compression of the core material according to its thickness gives rise to internal tensions which do not allow to guarantee a cylindrical hole geometry according to the thickness.

According to the tests carried out by the inventors, once this hole has been made by the work of the needle, the final geometry of the hole is still impacted by the traction of the loop of fibers within the hole, which gives rise to ovalization phenomena depending on the thickness in particular for polyurethane foams, namely after impregnation of the resin within the reinforcement, the geometry of the reinforcement cannot be guaranteed.

The use of a needle can also give rise to phenomena of deviation of the trajectory of the needle during piercing, in particular on the material having different layers of different densities, or else if the core material is covered of metal facing sheets, when the insertion direction is inclined, (not perpendicular), locally with the plane of the layers, According to the findings of the inventors, such a method according to US.3030.256 B1, WO2006/125562 and EP 3.173.216 A1, requires reinforcing the panel with fibrous reinforcements of small section, in order to minimize the disadvantages, and therefore to provide a surface density of the reinforcements (number of fibrous reinforcements relative to the surface of the panel) of high number, which has the disadvantage of increasing the manufacturing time, and therefore the cost of the reinforced product.

SUMMARY

The invention improves the situation.

According to a first aspect, provision is made of a method for reinforcing a flat or 3D preformed panel, according to its thickness E:

a step a) of providing a reinforcing element which is elongated, flexible, with two longitudinal ends having a length L strictly greater than or equal to twice the thickness E of the panel at the point of insertion, a step b) of positioning and holding said reinforcing element on one side of the panel, called the insertion side, a step c) of gripping the reinforcing element, on the insertion side in an intermediate gripping position between the two longitudinal ends of the reinforcing element, an insertion step d) wherein said reinforcing element gripped in its intermediate position is pulled through a bore passing through the panel, by folding the reinforcing element back on itself, and to a final position wherein the two longitudinal ends project from the bore on the insertion side or else are provided flush with the insertion side, a loop of the reinforcing element projecting from the bore on the side of the panel opposite to the insertion side or else being provided in a position in the vicinity of the outer wall of the panel on the side of the panel opposite to the insertion side configured so that a section of the loop divides the reinforcing element into two length sections each extending through the bore, positioning the ends of the two length sections flush with the external wall of the panel, on the side opposite to the insertion side.

The method comprises a step of forming the bore, prior to the insertion step d), wherein said bore is drilled into the panel by means of a drilling tool comprising a cylindrical body provided at its base with a circular cutting edge, and wherein the bore is formed by a movement combining an advance along the axis of the cylindrical body and a rotation around the axis of the cylindrical body. Optionally, the drill core resulting from the drilling of the bore, internal to the cylindrical body, is evacuated by pressurizing the cylindrical body with a gas.

Such a drilling tool comprising a cylindrical body provided at its base with a circular cutting edge has the advantage that it allows to ensure:

the creation of a bore (or hole) of cylindrical geometry, by removing material, generating a drill core internal to the cylindrical body, by minimizing the phenomena of compression of the material of the panel and therefore the internal tensions at the pierced bores, the formation of such bores with minimization of internal tensions, without limitation on the diameter of the bore which may be of a diameter much greater than those created by the work of a needle, for example with a diameter greater than or equal to 2 mm, even greater than or equal to 4 mm, or even greater than 6 mm, or else greater than or equal to 8 mm, or even greater than or equal to 10 mm, and or even without limitation on the thickness of the material, ensure the creation of a bore with a controlled rectilinear trajectory, minimizing internal tensions, even if the panel material is a multilayer, including different superimposed layers of different materials and of different densities, or else if the panel comprises facing sheets, for example metallic sheets, and even if the drilling angle is not locally at the drilling point perpendicular to the surface of the panel to be pierced, or else locally perpendicular to the intermediate surfaces of the different layers.

Guaranteeing a bore with a controlled cylindrical geometry, minimizing internal tensions, then allows to insert the reinforcing element, which is in particular fibrous, according to step d) with a controlled lining, in particular a controlled section of the reinforcing element, but without excess so as not to lose the cylindrical geometry giving the final shape of the reinforcement bridges during the application of the resin.

On this occasion, it can be noted that gripping the reinforcing element in an intermediate position forms a loop, which during step d) is pulled through the bore from the insertion side of the panel to the side of the panel opposite to the insertion side, this loop gripped by a gripper can generate stress as it travels through the through bore.

Particular attention can be paid so that the section of this loop does not alter the geometry of the pierced bore, in particular by the choice of a specific insertion tool, and which comprises in addition to a rod and a gripper (in particular a hook or a controlled clamp) at the end of this rod, a tube. The rod and gripper assembly is slidably mounted in the tube, said gripper being provided protruding from the mouth of the tube when gripping the reinforcing element in step c), and wherein the gripper is retracted within the tube, when the gripper is driven along the axis of the bore, from the insertion side in the direction of the side of the panel opposite to that of insertion during the insertion step d).

The external diameter of the tube is selected in relation to the diameter of the bore, equal to or slightly less than the latter. The retraction of the gripper (in particular of the controlled gripper or of the hook) in the tube allows to force the loop within the tube, and thus advantageously to avoid friction (or stresses) when the insertion tool pulls this loop over the length of the through bore.

According to one embodiment, the step d) of insertion is carried out by the use of an insertion tool which comprises a rod configured to pass through the bore of the panel, from the side opposite to the insertion side, and in the direction of the insertion side, the rod being provided with a hook at its distal end, protruding from the insertion side when the hook grips the reinforcing element in step c), the insertion step d) ensuring the formation of the loop around the hook when the hook is driven along the axis of the bore, from the insertion side to the side of the panel opposite to that of insertion.

According to one embodiment, the method has a cutting step e) successively to the insertion step d), wherein the loop of the reinforcing element is sectioned in the final position of the reinforcing element, dividing the reinforcing element into two length sections, each extending through the bore; the two ends of each length section can be provided projecting from both sides of the panel, or else flush with both sides of the panel, or else projecting from one side of the panel and flush with the other side of the panel.

According to one embodiment, the cutting step e) is carried out by said insertion tool which comprises a blade mounted on the insertion tool, movable relative to the hook, and wherein the loop is sectioned during step e) by means of an actuating mechanism configured to switch said blade from a retracted position at a distance from the hook, to a cutting position wherein said blade sections the loop of the reinforcing element resting on the hook, with a shearing effect between the blade and the hook.

According to one embodiment, the insertion tool comprises the rod and the hook, but also a tube, the rod and hook assembly being slidably mounted in the tube, said hook being provided protruding from the mouth of the tube when gripping the reinforcing element in step c), and wherein the hook is retracted within the tube, when the hook is driven along the axis of the bore, from the insertion side to the side of the panel opposite to that of insertion during the insertion step d).

Alternatively, the insertion step d) is carried out by the use of a tool which comprises a rod configured to pass through the bore of the panel from the side opposite to the insertion side and in the direction of the insertion side, said rod being provided with a controlled clamp at its distal end, protruding from the insertion side when the controlled clamp grips the reinforcing element in step c).

The controlled clamp comprises two jaws configured to switch from an open position allowing the positioning of the reinforcing element between the two jaws to a closed position wherein the two jaws close on the reinforcing element by grasping it.

The insertion step d) ensures the formation of the loop around the controlled clamp when the clamp is driven along the axis of the bore, from the insertion side to the side of the panel opposite to that of insertion.

In particular, the insertion tool may comprise the rod and the controlled clamp but also a tube, the rod and controlled clamp assembly being slidably mounted in the tube, said controlled clamp being provided protruding from the mouth of the tube when gripping the reinforcing element in step c), and wherein the controlled clamp is retracted within the tube, when the controlled clamp is driven along the axis of the bore, from the insertion side to the side of the panel opposite to that of insertion during the insertion step d).

According to one embodiment, the two jaws of the controlled clamp are formed by elastically deformable elements which, when protruding from the mouth of the tube, force the jaws, thanks to the elasticity of the elastically deformable elements, in the open position where the jaws extend radially beyond the internal radius of the tube, the insertion tool being configured such that switching the jaws from the open position to the closed position is caused during the retraction of the clamp within the tube during which the two jaws are forced by the tube to be closed on each other during the sliding of the rod within the tube.

Advantageously, the cutting step e) can be carried out by said insertion tool which comprises a blade mounted in the tube, movable relative to the clamp, and wherein the loop is sectioned during step e) by means of an actuating mechanism configured to switch said blade from a retracted position at a distance from the clamp within the tube in the closed position of the jaws, to a cutting position wherein said blade sections the loop of the reinforcing element engaged with the clamp within the tube, with a shearing effect between the blade and the controlled clamp.

Advantageously, the blade can be slidably arranged in an intermediate position between the two jaws, configured to section the loop of the reinforcing element along a cutting plane interposed between the two jaws of the clamp then in a position closed on the reinforcing element.

According to an alternative embodiment, step e) is carried out while the loop is positioned protruding from the panel on the side of the panel opposite to the insertion side in the final position of the reinforcing element, by a cutting tool distinct from the insertion tool sectioning the loop along an intermediate cutting plane between the hook (or the controlled clamp) of the insertion tool and the outer wall of the panel, the cut generating scrap formed by the folding of the loop According to one embodiment, the intermediate position of the gripping is the middle of the reinforcing element, or else a position close to the middle of the reinforcing element, at a distance of about 20% of the length L of the reinforcing element relative to its middle. According to one embodiment, the reinforcing element is a set of juxtaposed yarns extending lengthwise over the length L of the reinforcing element. Optionally, but not necessarily, the yarns of the assembly can be twisted together along the length of the reinforcing element.

According to one embodiment, said positioning and holding step b) is carried out by means of a holding mechanism comprising two clamps, configured to hold said reinforcing element in two positions, on either side, of the middle of the reinforcing element along its length. The gripping of the reinforcing element in step c) is achieved with the hook of the insertion tool protruding from the insertion side, by moving the clamps engaged with the reinforcing element from a position wherein the reinforcing element does not pass through the hook to a position wherein an intermediate part such as the middle of said reinforcing element passes through the hook.

According to one embodiment, robotic and/or automated means are provided so as to allow:
 different positions of said insertion tool relative to the panel,
 different inclinations of said insertion tool relative to the panel and so as to allow the insertion of a plurality of reinforcing elements according to a configurable spatial distribution of the insertion points and according to adjustable inclinations.

In particular, a panel support is provided, the robotic means comprising, disposed on either side of the panel support:
 a first robotic arm, handling the insertion tool, and
 a second robotic arm, handling the two clamps of the holding mechanism.

According to a second aspect, the invention also relates to a method for manufacturing a composite panel implementing the panel reinforcement method according to its thickness in accordance with the invention to achieve insertions of reinforcing elements into a panel, each reinforcing element protruding from both sides of the panel, or else provided flush with both sides of the panel, or else protruding from one side of the panel and flush with the other side of the panel, and wherein two skins are added against both sides of the panel, the internal face of each skin facing the panel in contact with the protruding/flush part(s) of the reinforcing elements, then a resin is injected under vacuum impregnating the skins and the reinforcing elements within the panel, with creation of reinforcing bridges through the bores of the panels, each reinforcing bridge comprising a reinforcing element impregnated with resin, the composite panel being obtained, after polymerization of the resin, with two skins bonded by their internal face respectively to both sides of the panel, and the presence of reinforcing bridges in the form of the reinforcing element impregnated with resin joining the two skins together.

According to a third aspect, the invention also relates to a method for manufacturing a composite panel implementing the panel reinforcement method according to the invention, to achieve insertions of reinforcing elements into a panel each reinforcing element protruding from both sides of the panel, or else provided flush with both sides of the panel, or else protruding from one side of the panel and flush with the other side of the panel, and wherein two skins are added against both sides of the panel, the internal face of each skin facing the panel in contact with the protruding/flush part(s) of the reinforcing elements, and wherein the reinforcing elements and the two skins comprise reinforcing fibers, and thermoplastic fibers and wherein the skin and panel assembly reinforced by the reinforcing elements is heated, until the thermoplastic fibers melt, the composite panel being obtained, after solidification by cooling the thermoplastic polymer, with two skins bonded by their internal face respectively to both sides of the panel, and the presence of reinforcing bridges in the form of the reinforcing fibers of the reinforcing elements impregnated with thermoplastic polymer joining the two skins together.

According to a fourth aspect, the invention also relates to a method for manufacturing a composite panel implementing the panel reinforcement method according to its thickness in accordance with the invention, to achieve insertions of reinforcing elements into a panel, each reinforcing element protruding from both sides of the panel, or else provided flush with both sides of the panel, or else protruding from one side of the panel and flush with the other side of the panel, and wherein two skins are added against both sides of the panel, the internal face of each skin facing the panel in contact with the protruding/flush part(s) of the reinforcing elements, then a resin is injected under a pressure greater than atmospheric pressure at the injection points in a mold, the injection pressure less than or equal to 3 bars, the mold maintained under vacuum between 0.2 and 0.3 bar below atmospheric pressure, the resin impregnating the skins and the reinforcing elements within the panel, with creation of reinforcing bridges through the bores of the panels, each reinforcing bridge comprising a reinforcing element impregnated with resin, the composite panel being obtained, after polymerization of the resin, with two skins bonded respectively to both sides of the panel, by their internal face, and the presence of reinforcing bridges in the form of the reinforcing element 1 impregnated with resin joining the skins together.

According to a fifth aspect, the invention also relates to a composite panel obtained according to the method for manufacturing a composite panel which is the object of the second aspect, of the third aspect or of the fourth aspect, the composite panel comprising two skins bonded by their internal face respectively to both sides of the panel, and the presence of reinforcing bridges in the form of reinforcing fibers of the reinforcing elements impregnated with resin joining the two skins together; said composite panel having the following features:
 a thickness E of the panel, excluding skins, comprised between 30 mm and 300 mm, in particular comprised between 50 mm and 200 mm, cylindrical reinforcing bridges with a diameter comprised between 2.5 mm and 12.5 mm, a reinforcing fiber content in the reinforcing bridges comprised between 30% and 80% by volume, and for example between 40% and 80%, or even between 50% and 70%.

The features exposed in the preceding paragraphs can, optionally, be implemented. They can be implemented independently of each other or in combination with each other.

BRIEF DESCRIPTION OF THE DRAWINGS

Other features, details and advantages will become apparent upon reading the detailed description below, and upon analyzing the appended drawings, wherein:

FIG. 10 is a view subsequent to FIG. 6 (as an alternative to FIG. 7), the hook having pulled the reinforcing element folded in half, in a final position for which two longitudinal ends of the reinforcing element are flush with the insertion side, and the loop of the reinforcing element, positioned close to the panel on the side of the panel opposite to the insertion side, slightly inside the panel.

FIG. 11 is a view of the method subsequent to FIG. 10, after the blade of the insertion tool has sectioned the loop of the reinforcing element, in said final position, (insertion tool not shown), the reinforcing element, being divided into two length sections, each having two flush ends on each side of the panel.

FIG. 12 is a view of the method consecutive to FIG. 7 in said final position of the reinforcing element (as an alternative to FIG. 8) for which the cut is made by a blade of the insertion tool, FIG. 12 more particularly illustrating a cutting tool, notably distinct from the insertion tool sectioning the loop in an intermediate position between the hook of the insertion tool and the external surface of the panel, on the side opposite to that of insertion, generating scrap formed by the sectioned loop.

DESCRIPTION

Figure 1:
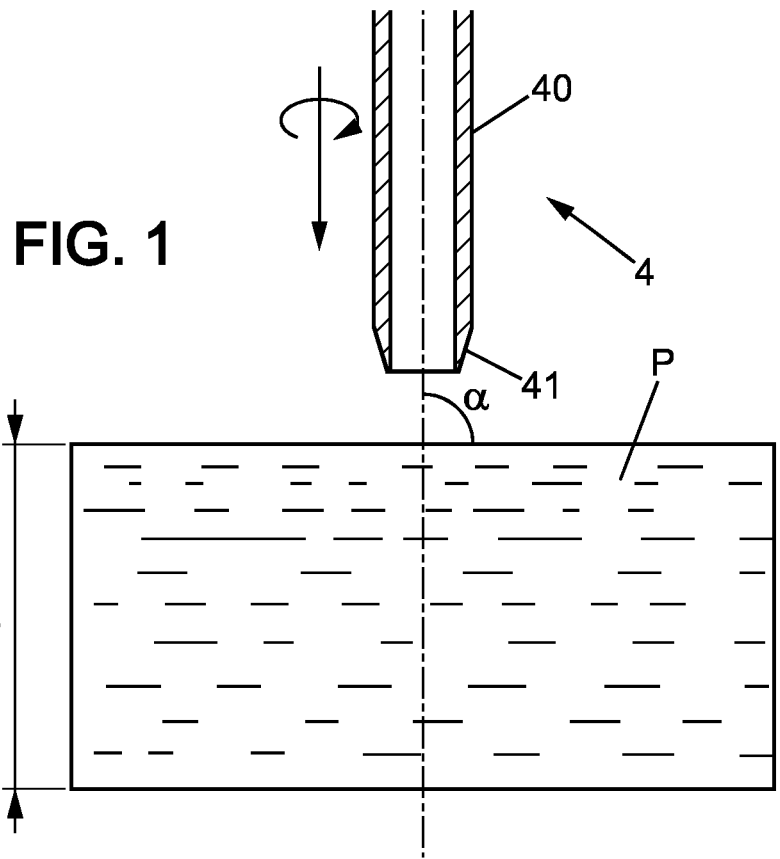
FIG. 1 schematically illustrates a drilling tool for carrying out the reinforcement method, according to one embodiment, with a cylindrical body provided with a circular cutting end at its base, the drilling tool being moved in a movement combining, on the one hand, a translation along the axis of the cylindrical body causing the advance of the cutting end in the direction of the panel, and, on the other hand, a rotation around the axis of the cylindrical body to obtain the bore, the axis of the drilling tool being oriented at an adjustable angle α, said panel being illustrated by way of example as a single-material panel.

The drawings and the description below contain, for the most part, elements of a certain nature. They can therefore not only serve to better understand the present disclosure, but also contribute to its definition, if necessary.

Also, the invention relates to a method for reinforcing a panel P according to its thickness E:
- a step a) of providing a reinforcing element 1 which is elongated, flexible, with two longitudinal ends 10, 11 having a length L strictly greater than or equal to twice the thickness E of the panel P at the point of insertion,
- a step b) of positioning and holding said reinforcing element 1 on one side of the panel, called the insertion side Ci
- a step c) of gripping the reinforcing element 1, in an intermediate gripping position between the two longitudinal ends of the reinforcing element 1 such as in its middle, on the insertion side Ci,
- an insertion step d) wherein said reinforcing element gripped in the intermediate position of the reinforcing element is pulled, through a bore 2 passing through the panel, by folding the reinforcing element back on itself, and to a final position Pf wherein the two longitudinal ends 10, 11 project from the bore 2 on the insertion side Ci or else are provided flush with the insertion side Ci, a loop 12 of the reinforcing element projecting from the bore 2 on the side of the panel opposite to the insertion side Ci, or else the loop 12 being provided in a position in the vicinity of the panel on the side of the panel opposite to the insertion side, in particular a slightly internal position, configured so that a cut (without scrap) of the loop divides the reinforcing element into two length sections 15, 16 each extending through the bore, positioning the ends 151, 161 of the two length sections 15, 16 flush with the wall of the panel on the side opposite to the insertion side Ci.

The intermediate gripping position in the input step c) can be the middle of the reinforcing element, or else a position close to the middle of the reinforcing element 1, for example at a distance of about 20% of the length L of the reinforcing element relative to its middle.

Figure 7:
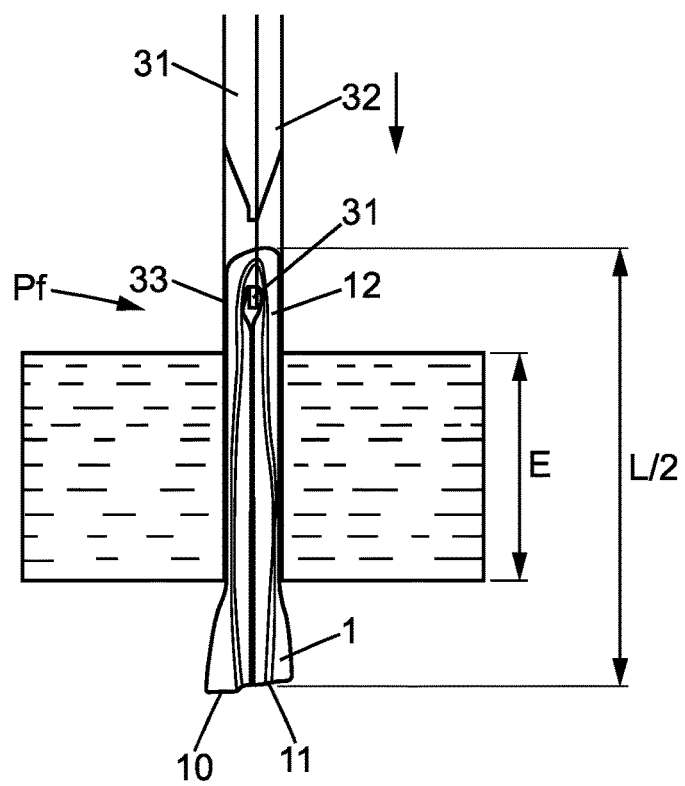
FIG. 7 is a view subsequent to FIG. 6, the hook having pulled the reinforcing element folded in half, in a final position for which two longitudinal ends of the reinforcing element protrude from the insertion side, the loop of the reinforcing element, protruding from the side opposite to that on the insertion side.

Advantageously, this mode of insertion allows to pull strongly on the reinforcing element 1 (without loss of fibers) which is folded in half with formation of the loop 12 during step d), and to its final position Pf as illustrated in FIG. 7 by way of example: such an insertion mode allows the insertion of a reinforcing element in particular formed of a set of juxtaposed yarns 13, extending lengthwise over the length L of the reinforcing element 1. Optionally, but not necessarily, the yarns 13 of the assembly are twisted together along the length of the reinforcing element.

The yarns 13 may be glass fiber yarns, carbon fiber yarns, aramid fiber yarns, plant fiber yarns, for example such as linen, or else polyester fiber yarns. This list is given by way of example, and is not limiting on the possible materials for the fibers of the yarns.

In this regard, FIG. 7 illustrates an exemplary embodiment for which, at the end of the pulling of step d), the reinforcing element projects from both sides of the panel, the two longitudinal ends of the reinforcing element projecting from the insertion side Ci, the loop 12 projecting from the side opposite to that of insertion. In such a case, the length L of the reinforcing element 1 is strictly greater than twice the thickness E of the panel, at the point of insertion.

According to other possibilities: taken alone, or in combination:
- at the end of the pulling in step d), the reinforcing element 1 can be flush with the insertion side Ci by pulling the reinforcing element by the travel just necessary so that the two longitudinal ends are flush with the wall of the panel, on the insertion side Ci (see FIG. 10),
- at the end of the pulling of step d), the loop 12 of the reinforcing element can be provided in a position in the vicinity of the panel on the side of the panel opposite to the insertion side, in particular slightly inside the panel configured so that a cut of the loop (without scrap) divides the reinforcing element into two length sections 15, 16 each extending through the bore, positioning the ends 151, 161 of the two length section 15, 16 flush with the outer wall of the panel on the side opposite to the insertion side Ci (see FIGS. 10 and 11).

In this particular case illustrated in FIGS. 10 and 11, with insertion of a reinforcing element in a direction substantially perpendicular to the mean plane or to the mean surface (neutral surface) of the panel, at the insertion point, the length of the reinforcing element may be equal to twice the thickness E of the panel. In such a case, the gripping of the reinforcing element is carried out in the middle of said reinforcing element 1.

Figure 8:
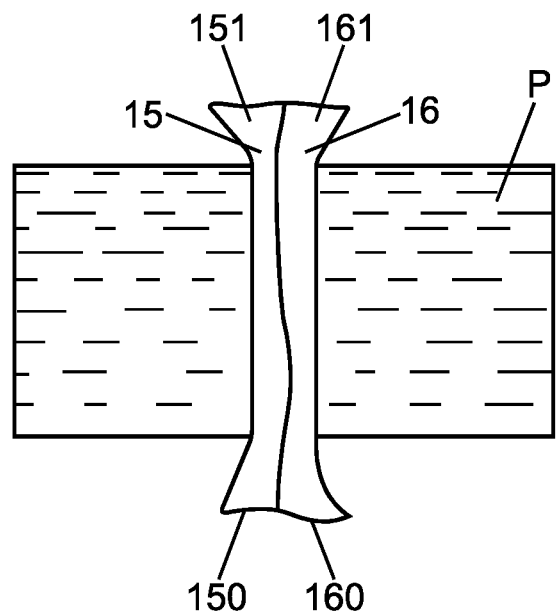
FIG. 8 is a view of the consecutive method of FIG. 7, after the blade of the insertion tool has sectioned the loop of the reinforcing element, in said final position, (insertion tool not shown), the reinforcing element, being divided into two length sections, each having two protruding ends on either side of the panel.

At the end of the reinforcement method, each reinforcing element 1 can be:
- protruding from both sides of the panel as illustrated in FIG. 8, once the loop 12 is cut, or else,
- provided flush with both sides of the panel as illustrated in FIG. 11, once the loop is cut, or else,
- protruding from one side of the panel and flush with the other side of the panel (embodiment not shown), respectively on the insertion side and on the side of the panel opposite to the insertion side (or vice versa).

The result of FIG. 11, with the presence of two length sections 15, 16 whose ends 150, 151; 160, 161 are flush with both sides of the panel, can still be obtained from the result of FIG. 8, by being flush with the projecting ends of FIG. 8, using a cutting tool distinct from the insertion tool.

For example, the set of yarns may have the following features:
- number of yarns comprised between 10 and 600,
- each yarn having a count (tex) corresponding to the weight in grams of 1000 meters of yarn comprised between 200 tex and 35000 tex.

Figure 1A:
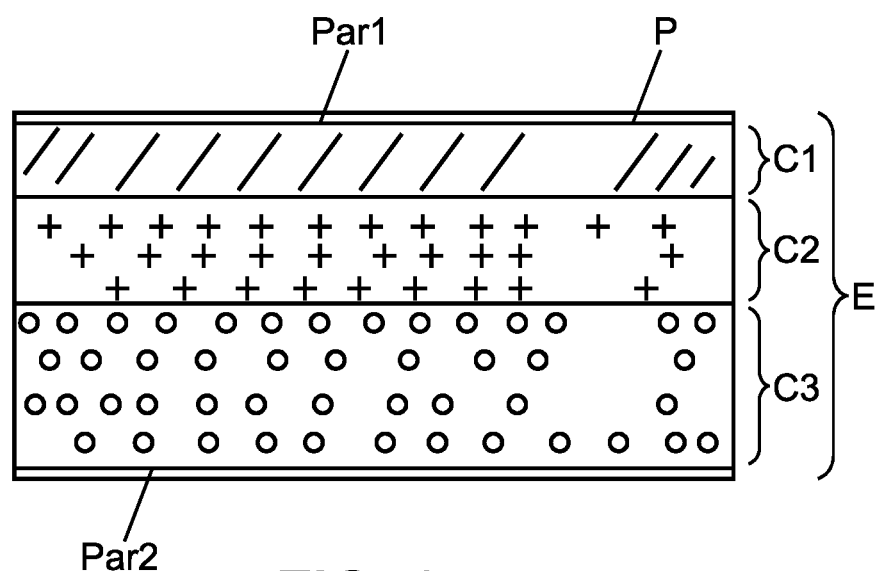
FIG. 1a shows schematically the section of a multi-material panel comprising several layers of materials, including two facing sheets, which can be reinforced with the method disclosed by the present application, and as an alternative of the single-material panel of FIG. 1.

The panel intended to form the core of the composite panel can be mono-material, and as illustrated in FIG. 1. The core material reinforced by the insertion of one (or more) reinforcing element(s) can, by way of non-limiting example, be a cellular foam panel such as polyethylene (PE) foams, polyethylene terephthalate (PET) foams, polyurethane (PUR) foams, acrylic foams, bio-based foams, polymethacrylimide (PMI) foams and also various materials such as cork for example. According to another embodiment illustrated by way of indication in FIG. 1a, the panel P can be multilayer C1, C2, C3, or even multi-material, or even comprise for example facing sheets Par 1, Par 2. The panel can for example have several layers C1, C2, C3, of numbers comprised between 2 and N (integer greater than 3), of different features, for example several layers C1 to C3 in superposition of plastic foams, of different densities and/or of different materials (polyethylene foam or polyurethane foam; polyurethane foams (PUR), acrylic foams, biosourced foams, . . . ). The facing sheets have a thickness (for example a ratio of 100) much less than the thickness of the panel between the facing sheets, or even than the thickness of each layer C1 to C3. The facing sheets can for example be metal sheets, for example aluminum.

The panel intended to form the core of the composite panel can be a flat panel, as illustrated in the figures, or else 3D preformed, for example in the shape of an aircraft nose, or the curved hull of a boat. The aforementioned steps a), b), c), d) can be carried out on a flat panel or preformed panel (3D).

In the case of a 3D preformed panel, average surface means the surface which corresponds to that passing through the middle of the thickness of the panel which is parallel to the outer surfaces of the panel at the point of insertion. In the case of a flat panel, this mean surface is the mean plane which is parallel to the plane of the panel.

The thickness P of the panel may be comprised between 30 mm and 300 mm and in particular greater than or equal to 40 mm, or even greater than or equal to 50 mm.

According to one embodiment, the insertion step d) is performed by the use of an insertion tool 3 which comprises, for example, a rod 30 configured to pass through the bore 2

During its advance, the drilling tool 4 can be substantially perpendicular to the mean plane (or to the mean surface) of the panel ($\alpha=90°$), or else inclined relative to the mean plane (or to the mean surface) of the panel by an angle $\alpha$ strictly less than 90°, for example between 45° and 90° by way of non-limiting example.

Figure 2:
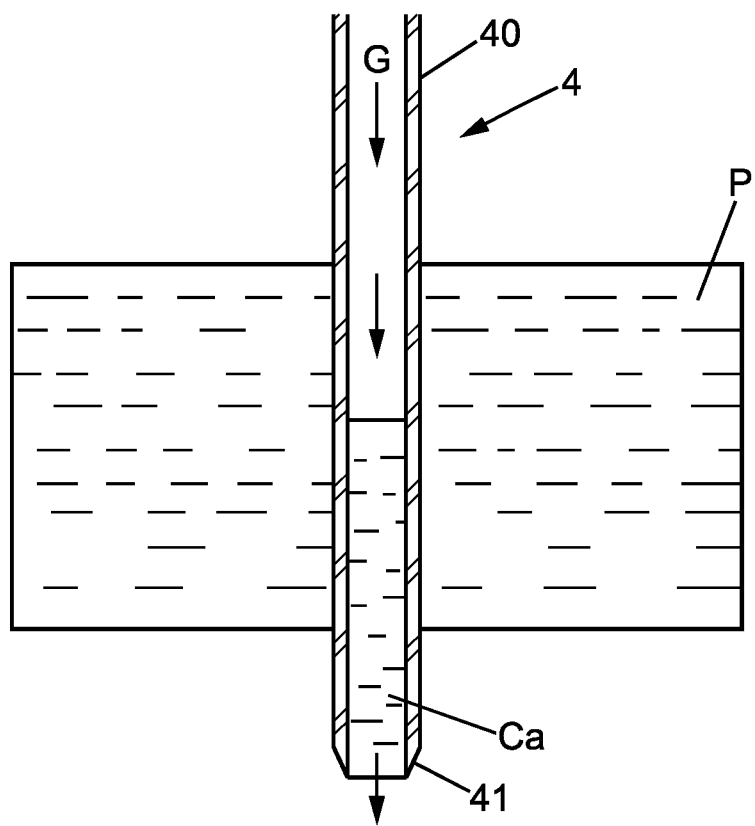
FIG. 2 is a view of the method subsequent to FIG. 1, the drilling tool having passed through the panel with production of the bore, a pressurized gas being injected into the cylindrical body to cause the expulsion of the drill core internal to the cylindrical body.
Figure 3:
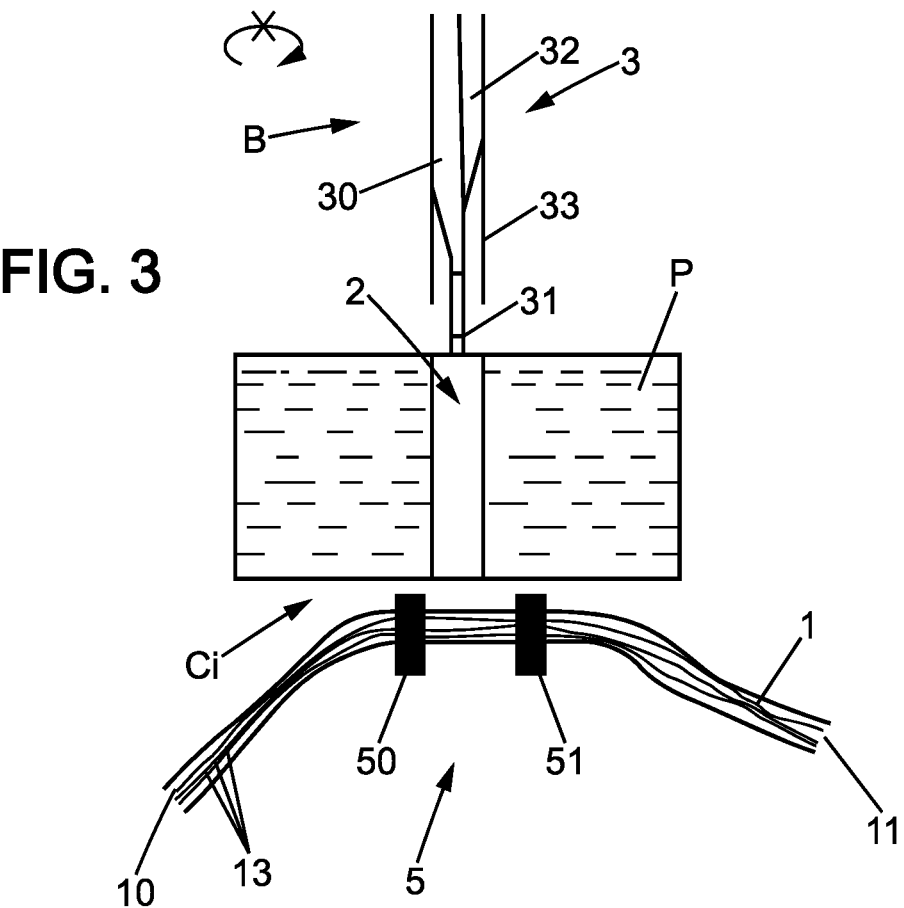
FIG. 3 is a view of the method subsequent to FIG. 2, once the bore has been drilled, illustrating said step b) of positioning and holding said reinforcing element on one side of the panel, called the insertion side, by means of a holding mechanism comprising two clamps, holding a reinforcing element, in the shape of a strand of yarns, in two local positions, on either side of the middle of the reinforcing element, an insertion tool comprising a rod provided with a hook, a cutting blade and a tube, being positioned on the side of the panel opposite to the insertion side.
Figure 3A:
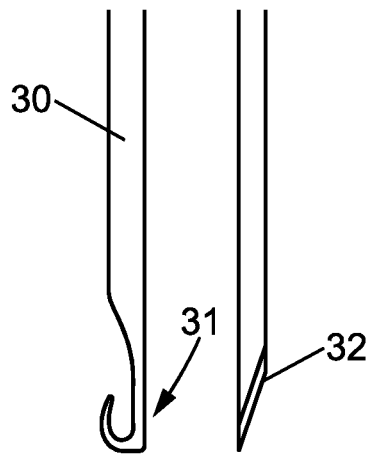
FIG. 3a is an exploded view of the rod/hook and blade assembly of said insertion tool.

At the end of the drilling step, the drill core resulting from the drilling of the bore, internal to the cylindrical body, can be evacuated by pressurizing the cylindrical body with a gas G, and as illustrated in FIG. 2. The pressurization of the gas, internal to the cylindrical body generates a force on the drill core Ca ensuring its ejection through the circular cutting edge.

The external diameter of the cylindrical body 40 of the drilling tool 4 is typically comprised between 4 mm and 14 mm, and/or the internal diameter of the cylindrical body is typically comprised between 3 mm and 12.5 mm.

The definition of the range of diameters (external and internal diameters of the cylindrical body) of tools also depends on the thickness E of the core material, namely the panel. For example, it is possible to project:

TABLE 1

Figure 5:
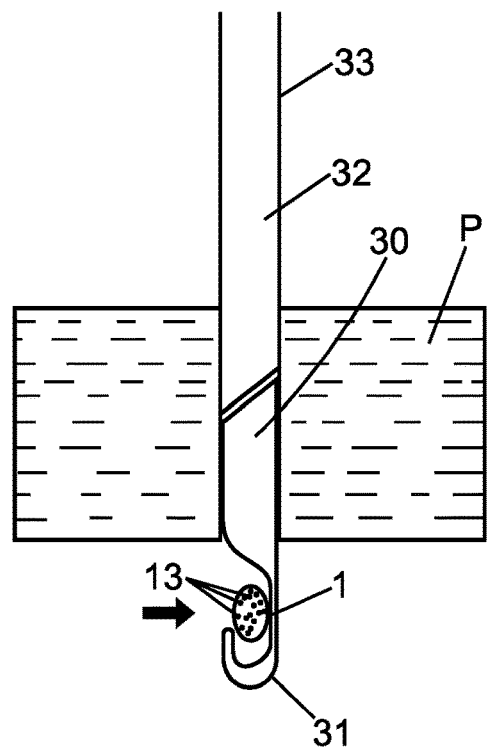
FIG. 5 is a view subsequent to FIG. 3, when the holding mechanism moves the insertion element from the position according to FIG. 4 where the reinforcing element does not pass through the hook to a position where the middle of the reinforcing element passes through the hook.

| E (mm) | 30 to 40 | 50 | 60 | 70 | 80 | 90 | 100 | 110 to 150 | 160 to 200 | 210 | 220 | 230 to 300 |
|---|---|---|---|---|---|---|---|---|---|---|---|---|
| Ø Ext/int (mm) | | 4/3 | | | | 6/5 | | 8/7 or 8/6.5 or 8/6 | 10/9 or 10/8.5 or 10/8 | 12/10.5 or 12/10 | | 14/12.5 or 14/12 | of the panel from the side opposite to the insertion side Ci in the direction of the insertion side. This rod 30 is provided with a hook 31 at its distal end protruding from the insertion side Ci when the hook 31 grips the reinforcing element in step c), and as illustrated in FIG. 5.

Figure 6:
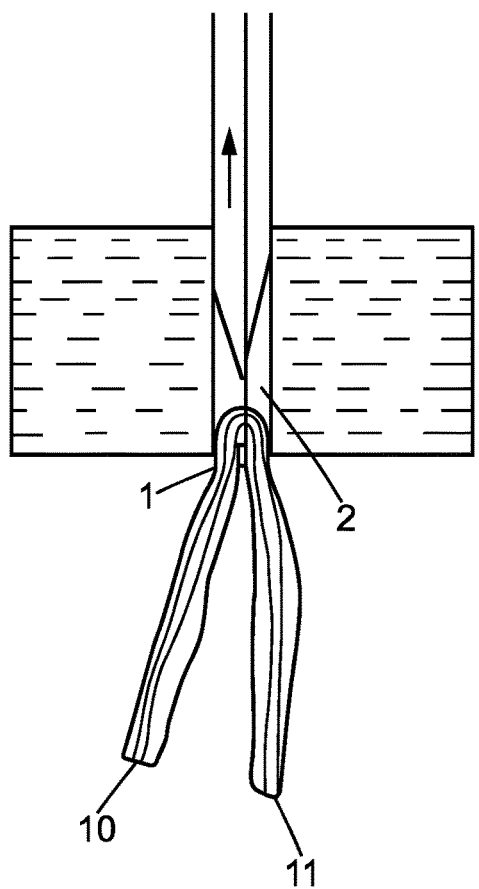
FIG. 6 is a consecutive view of FIG. 5 for which the hook pulls the reinforcing element in its middle through the bore, causing the reinforcing element to fold back on itself with the formation of a loop around the hook.

Step d) of insertion with a pulling of the loop 12 then ensures the formation of the loop 12 around the hook 31 when the hook is driven into the bore along its axis, from the insertion side Ci to the side of the panel opposite to that of insertion, and as illustrated in FIGS. 6 and 7, or else in FIGS. 6 and 10. At the end of the pulling of step d), the loop 12 may project on the side of the panel opposite to the insertion side, as illustrated in FIG. 7, or else be positioned close to the side of the panel opposite to the insertion side, in particular slightly inside the core material as illustrated in FIG. 10.

According to one embodiment, the method may have a step of forming the bore, prior to the insertion step d), wherein said bore 2 is drilled into the panel P by means of a drilling tool 4. Preferably, the formation of the bore is therefore not obtained by the insertion tool, but by a specific drilling tool, distinct from the insertion tool.

The drilling tool 4 may comprise a cylindrical body 40 provided at its base with a circular cutting edge 41. The bore is formed by a movement combining an advance along the axis of the cylindrical body 40 and a rotation around the axis of the cylindrical body 41, and as shown in FIG. 1, and until the drilling tool passes through the panel, as illustrated in FIG. 2.

The circular cutting edge 41 can be formed by a bevel, which can be an outer bevel, and as visible in FIG. 1. An outer bevel allows not to compress the drill core in the hollow of the cylindrical body during drilling, and unlike an interior bevel. This makes it easier to remove the drill core.

The greater the thickness of the panel, the greater the path for the tool to travel will also be and even more with oblique insertions. There is also an increase in the tubes of the coring tools to increase their stability and rigidity to penetration into the core material.

According to one embodiment, said positioning and holding step b) is carried out by means of a holding mechanism 5 comprising two clamps 50, 51, configured to hold said reinforcing element 1 in two positions, on either side, of the middle of the reinforcing element 1 along its length.

Figure 4:
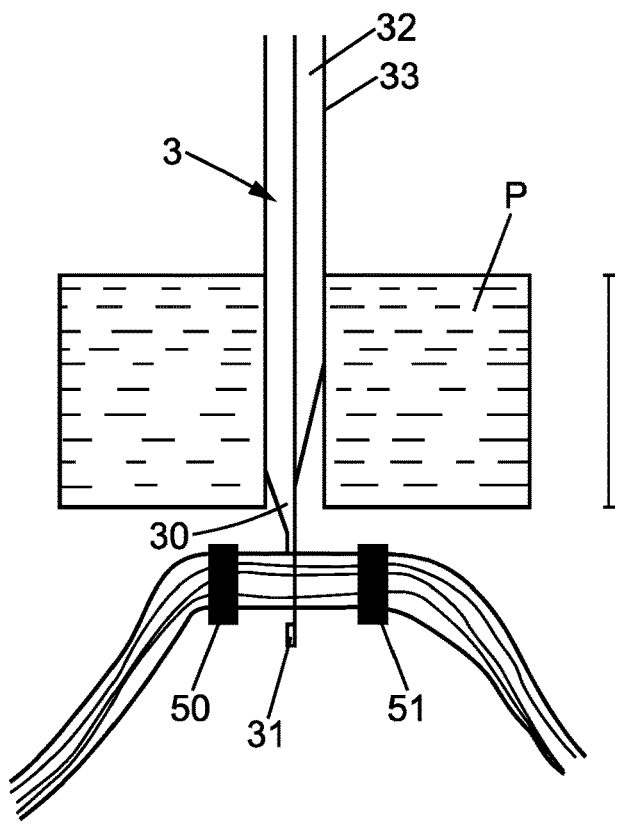
FIG. 4 is a view of the method subsequent to FIG. 3, the insertion tool having passed through the panel until the hook protrudes from the panel on the insertion side.

The insertion tool which comprises the rod 30 is then actuated to pass through the bore 2 of the panel from the side opposite to the insertion side Ci in the direction of the insertion side and until the hook 31 at its distal end protrudes from the insertion side Ci, and as illustrated in FIG. 4.

The gripping of the reinforcing element 1 in the gripping step c) can be obtained while the hook 31 of the insertion tool protrudes from the insertion side, by moving the clamps 50, 51 engaged with the reinforcing element 1 from a position wherein the reinforcing element does not pass through the hook (that is to say FIG. 4) to a position wherein an intermediate part such that the middle of said reinforcing element 1 passes through the hook (that is to say FIG. 5).

According to one embodiment, the insertion tool 3 may comprise the rod 30 and the hook 31, but also a tube 33, the rod 30 and the hook 31 assembly being mounted in the tube 33, in particular slidably relative to the tube. The diameter of the tube is dimensioned relative to the diameter of the drilling tool, namely substantially equal to or less than the diameter of the cylindrical body 40.

The hook 31 is provided protruding from the mouth of the tube 33 when gripping the reinforcing element in step c). When the hook 31 and the rod 30 are mounted to slide relative to the tube 33, the hook 31 is retracted within the tube 33, namely when the hook 31 is driven along the axis of the bore, from the insertion side to the side of the panel opposite to that of insertion during the insertion step d). Thus at the final position Pf, it is noted that the hook 31 pulling the loop 12 is inside the tube 33, which is itself in the extension of the flush bore 2, as illustrated in FIG. 7, or even positioned slightly internal as illustrated in FIG. 10, on the side opposite to that of insertion: the loop 12 then housed in the tube 33.

The retraction of the gripper (hook) in the tube allows to force the loop within the tube, and thus advantageously to avoid friction (or stresses) when the insertion tool pulls this loop along the length of the through bore.

The method can also have a cutting step e) successively to the insertion step d), wherein the loop 12 of the reinforcing element 1 is sectioned in the final position Pf of the reinforcing element 1. During cutting, the reinforcing element can be divided into two length sections 15, 16, each extending through the bore, and each projecting from both sides of the panel by their ends 150, 151; 160, 161; and as illustrated in FIG. 8. Alternatively, at the end of the cut, the two length sections may be provided flush by their ends 150, 151, 160, 161 on both sides of the panel, as illustrated in FIG. 11. Again and according to an embodiment not shown, the two length sections may be provided flush with one side of the panel, and protruding from the other.

According to one embodiment, the cutting step e) can be carried out by said insertion tool 3 which comprises a blade 32 mounted on the insertion tool movable relative to the hook 31: the loop 12 is sectioned during step e) by means of an actuating mechanism configured to switch said blade 32 from a retracted position at a distance from the hook 31, to a cutting position wherein said blade 32 sections the loop 12 of the reinforcing element 11 resting on the hook 31, with a shearing effect between the blade 32 and the hook 31, if necessary the loop 12 held within the optional tube 33.

Such a cutting step e), when carried out by the cutting blade 32 mounted on the insertion tool 3, on board the latter advantageously allows to:

divide the reinforcing element 1 in two, advantageously without material scrap
optionally, to cut the loop 12 then positioned slightly inside the panel on the side opposite to the insertion side Ci and so that the ends 151, 161 thus cut of the two length sections 15, 16, are flush with the side opposite to that of insertion, and as shown in FIGS. 10 and 11.

In the end, it is possible to obtain the presence of a through reinforcement within the bore, for example constituted by a set of yarns of number equal to twice the number of yarns of the reinforcing element of length L, of dimension L/2 substantially equal to half the length L of the reinforcing element 1.

According to another alternative embodiment, illustrated by way of example in FIG. 12, step e) can be carried out while the loop 12 is positioned protruding from the panel on the side of the panel opposite to the insertion side Ci in the final position Pf of the reinforcing element 1, by a cutting tool 6 distinct from the insertion tool 3.

This cutting tool sections the loop 12 along an intermediate cutting plane between the hook 31 of the insertion tool 3 and the outer wall of the panel; this cutting generating scrap 120 illustrated in dotted lines in FIG. 12 formed by the folding of the loop 12 thus sectioned: This cutting tool can be an electric cutter, a rotary blade, mechanical scissors (for example pneumatic scissors), an electric (or pneumatic) clipper, or else an ultrasonic cutting tool.

In the end, it is possible to obtain the presence of a through reinforcement within the bore, for example consisting of a set of yarns of a number equal to twice the number of yarns of the reinforcing element of length L, of dimension slightly less than the dimension L/2 substantially equal to half the length L of the reinforcing element 1, due to scrap 120.

As illustrated in FIG. 12, the cutting plane of the tool 6 can be substantially flush with the wall of the panel on the side opposite to the insertion side Ci, in order to obtain two length sections 15, 16 passing through the bore with ends 151, 161 flush with this side and as illustrated in FIG. 11. Alternatively, the cutting plane of the tool 5 can be moved away from the outer wall on the side opposite to the insertion side Ci, in order to obtain two length sections 15, 16 with ends 151, 161 protruding from this side and as illustrated in FIG. 7.

According to an alternative to the insertion tool with hook, illustrated by way of example in FIGS. 13 to 18, the insertion step d) is carried out by the use of an insertion tool 3 which comprises a rod 30 configured to pass through the bore 2 of the panel from the side opposite to the insertion side Ci and in the direction of the insertion side Ci, said rod 30 being provided with a controlled clamp 34, at its distal end.

This controlled clamp 34 protrudes from the insertion side Ci when the controlled clamp 34 grips the reinforcing element in step c), the controlled clamp 34 comprising two jaws 340, 341 configured to switch from an open position Po allowing the positioning of the reinforcing element 1 between the two jaws 340, 341 to a closed position Pfe wherein the two jaws 340, 341 close on the reinforcing element 1 by grasping it, the insertion step d) ensuring the formation of the loop 12 around the controlled clamp 34 when the clamp is driven along the axis of the bore 2, from the insertion side Ci to the side of the panel opposite to that of insertion.

Advantageously, the insertion tool 3 comprises the rod 30 and the controlled clamp 34, but also a tube 33, the rod 30 and controlled clamp 34 assembly being slidably mounted in the tube 33.

Said controlled clamp 34 is provided protruding from the mouth of the tube 33 when the reinforcing element is gripped in step c), and wherein the controlled clamp 34 is retracted within the tube 33, when the controlled clamp 34 is driven along the axis of the bore, from the insertion side to the side of the panel opposite to that of insertion during the insertion step d).

The retraction of the gripper (the controlled clamp) in the tube allows to force the loop 12 within the tube 33, and thus advantageously to avoid friction (or stresses) when the insertion tool pulls this loop over the length of the through bore.

According to an advantageous embodiment feature, the two jaws 340, 341 of the controlled clamp 34 are formed by elastically deformable elements which, when protruding from the mouth of the tube 33, force the jaws 340, 341, thanks to the elasticity of the elastically deformable elements, in the open position Po where the jaws 340, 341 extend radially beyond the internal radius of the tube 33.

The insertion tool is configured such that switching the jaws 340, 341 from the open position Po to the closed position Pfe is caused during the retraction of the clamp 34 within the tube 33 during which the two jaws 340, 341 are forced by the tube 33 to be closed on each other during the sliding of the rod 30 within the tube 33. This embodiment is clever in that a single actuator allows, by pulling on the rod, to retract the controlled clamp within the tube, but also to cause the jaws to close, or by pushing on the rod to deploy the controlled clamp protruding from the mouth of the tube, but again to cause the jaws to open According to one embodiment wherein the cutting step e) is carried out by said insertion tool 3 which comprises a blade 32 mounted in the tube 33, movable relative to the controlled clamp 34: the loop is sectioned 12 during step e) by means of an actuating mechanism configured to switch said blade 32 from a retracted position at a distance from the controlled clamp 34 within the tube 33 in the closed position Pfe of the jaws 340, 341, to a cutting position wherein said blade 32 sections the loop 12 of the reinforcing element 1 engaged with the clamp 34 controlled within the tube 33, with a shearing effect between the blade 32 and the clamp 34.

According to a configuration maximizing the shear, the blade 32 is arranged slidably; advantageously in an intermediate position between the two jaws 340, 341, configured to section the loop of the reinforcing element 1 along a cutting plane interposed between the two jaws 340, 341 of the clamp 34 then in the closed position Pfe. The risk of false cutting is limited, in particular for large section reinforcements.

Alternatively, step e) is carried out while the loop 12 is positioned protruding from the panel on the side of the panel opposite to the insertion side Ci in the final position Pf of the reinforcing element, by a cutting tool 6 distinct from the insertion tool 3 sectioning the loop 12 along an intermediate cutting plane between the gripper, on the one hand, consisting of the clamp 34 controlled by the insertion tool, and the wall of the panel, on the other hand, the cut generating scrap (formed by the loop 12 fold).

In general, it is possible to provide robotic and/or automated means so as to allow:

different positions of said insertion tool 3 relative to the panel P, different inclinations a of said insertion tool relative to the panel P and so as to allow the insertion of a plurality of reinforcing elements according to a spatial distribution of the adjustable insertion points and according to adjustable inclinations.

Regarding the inclination, it is understood that it can be a double inclination, namely a first inclination a, along a first axis of rotation in a first direction parallel to the mean plane or to the mean surface of the panel, and a second inclination along a second axis of rotation in a second direction parallel to the mean plane or to the mean surface of the panel and perpendicular to the first direction.

To this end, the method can be implemented in an installation which comprises a panel support P, the robotic means comprising, disposed on either side of the panel support:

a first robotic arm R1, in particular a six-axis robotic arm, handling the insertion tool 3, and a second robotic arm R2, in particular a six-axis robotic arm handling the two clamps 50, 51 of the holding mechanism 5. The preliminary step of drilling the bore can be carried out by a third robotic arm handling the drilling tool 4, or else by one of the two robotic arms, the first robotic arm R1 or the second robotic arm R2, by changing the tool.

The invention will also find a particular application for the implementation of a method for manufacturing a composite panel implementing the panel reinforcement method P in accordance with the invention in order to achieve insertions of reinforcing elements 1 into a panel P, each reinforcing element 1 being able to be protruding from both sides of the panel, as for example illustrated in FIG. 8, once the loop 12 is sectioned, or else flush with both sides of the panel as illustrated in FIG. 11, once the loop is sectioned, or else protruding from one side of the panel (insertion side Ci or opposite side) and flush with the other side of the panel (opposite side or insertion side Ci) according to one embodiment not illustrated.

Thus and in the final position Pf of the reinforcing element 1, the reinforcing element can be divided into two length sections 15, 16, each extending through the bore and each projecting from both sides of the panel by their ends 150, 151; 160, 161; and as illustrated in FIG. 8, or else flush with both sides of the panel according to FIG. 11 or else protruding from one side of the panel (insertion side Ci or opposite side) and flush with the other side of the panel (opposite side or insertion side Ci) according to an embodiment not shown.

Figure 9:
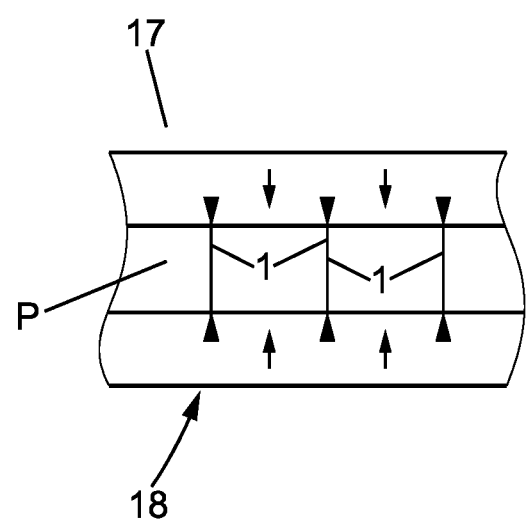
FIG. 9 is a view of a reinforced panel comprising several reinforcing elements 1, according to FIG. 8, by implementing the reinforcement method, and the addition of two textile skins, on each side of the panel, the internal face of each skin being intended to be in contact with the protruding ends of the reinforcing elements.
Figure 13:
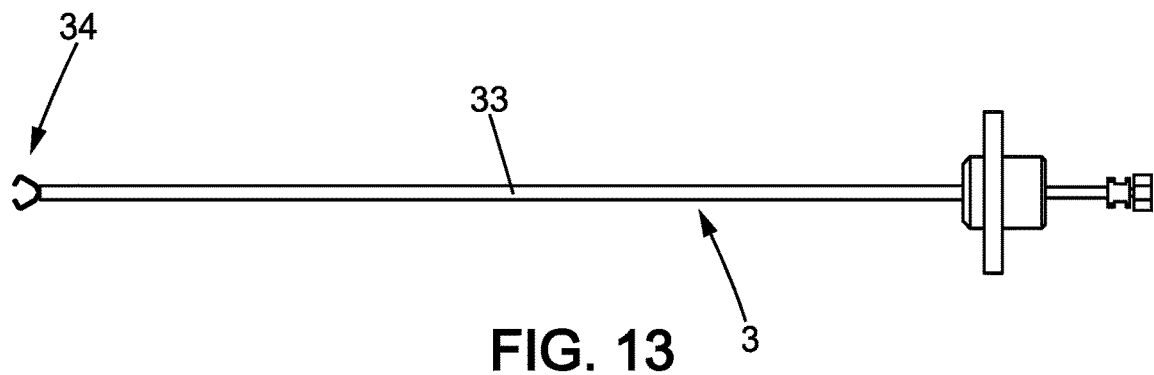
FIG. 13 is a view of the method according to the present disclosure according to an alternative embodiment for which a gripping tool is selected comprising a rod provided at its end with a controlled clamp, comprising two jaws configured to switch from an open position allowing the gripping of the reinforcing element to a closed position grasping the reinforcing element.
Figure 14:
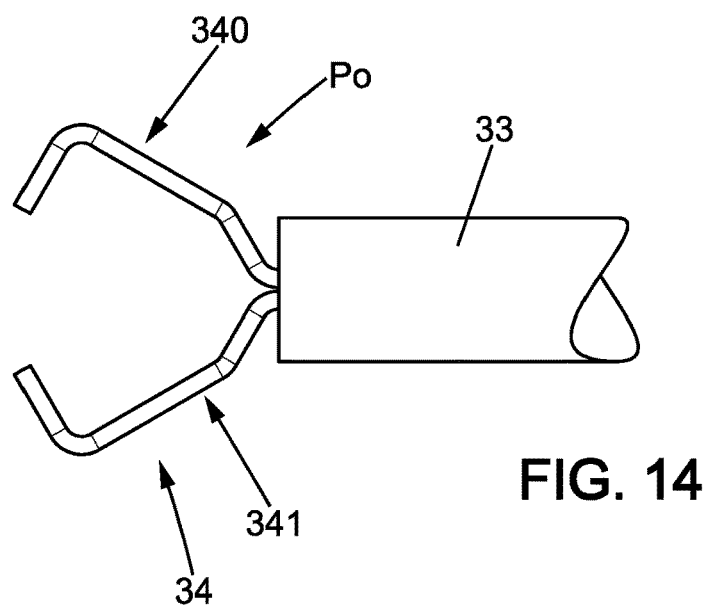
FIG. 14 is a detail view of the controlled clamp of the insertion tool according to FIG. 13, the two jaws of which are elastically deformable elements the elasticity of which forces the jaws into the open position.
Figure 15:
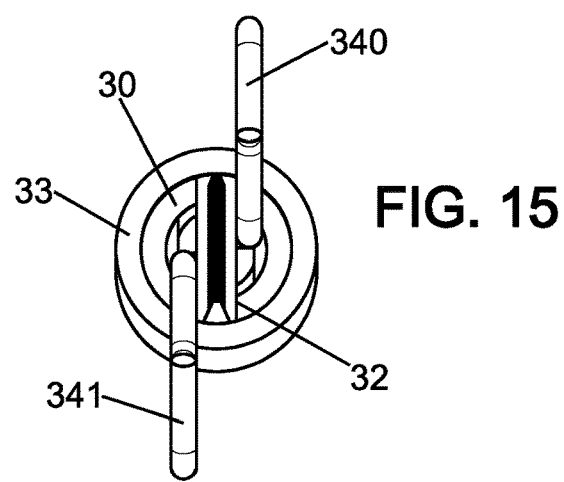
FIG. 15 is a detail and front view of the controlled clamp of the insertion tool according to FIG. 13 illustrating the two jaws in the open position, but still in the background, the tube and inside said tube, a cutting blade located in an intermediate plane between the two jaws.
Figure 16:
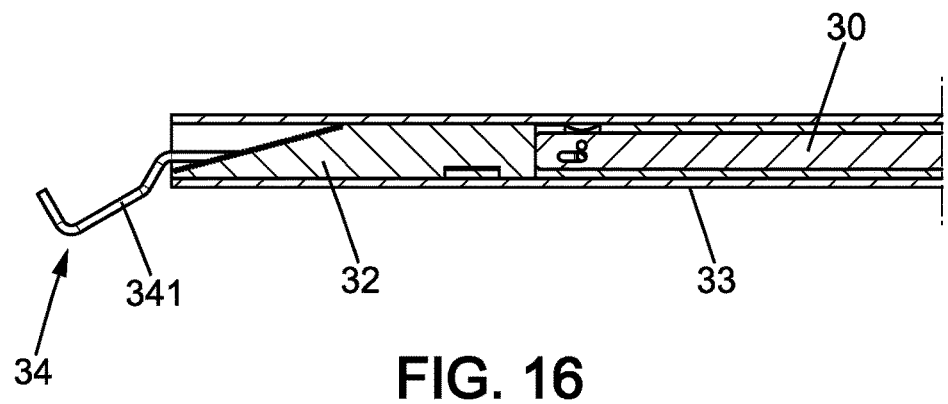
FIG. 16 is a sectional view of the insertion tool of FIG. 13, illustrating the internal rod to the tube, the fastening of elastically deformable elements to the end of the rod, the cutting blade, and one of the two jaws.
Figure 17:
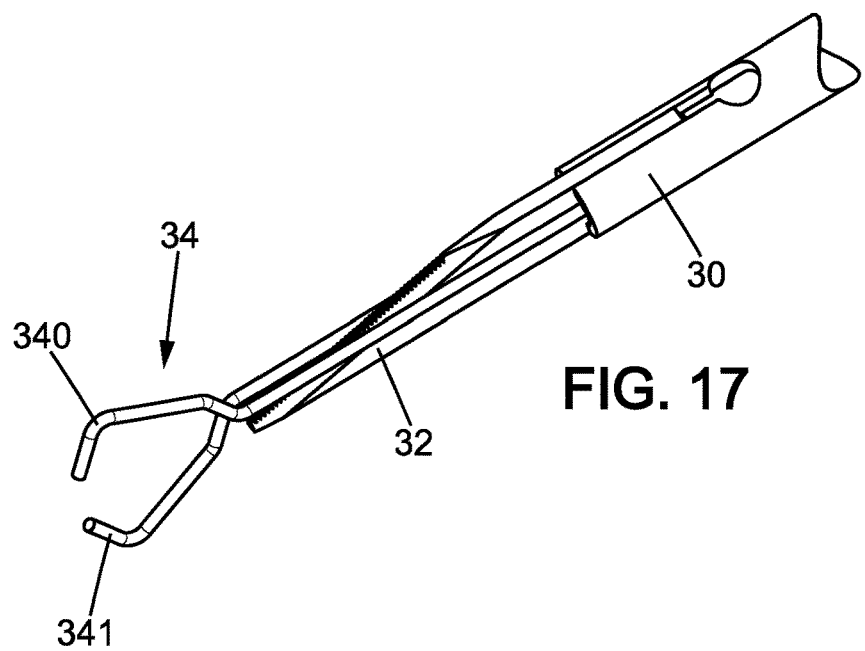
FIG. 17 is a partial view of the insertion tool of FIG. 13, showing the rod, the elastically deformable elements fastened to the end of the rod, the cutting blade, and the two jaws (with the tube hidden).
Figure 18:
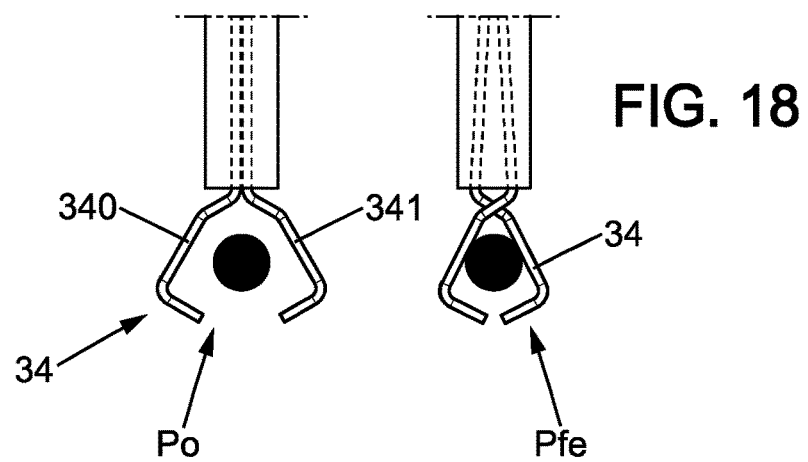
FIG. 18 are two views, schematically illustrating switching the jaws of the controlled clamp from the open position (view from the left) to the closed position (view from the right), obtained during the retraction of the clamp within the tube by the action of the tube which the elastically deformable elements to be closed on each other.
Figure 19:
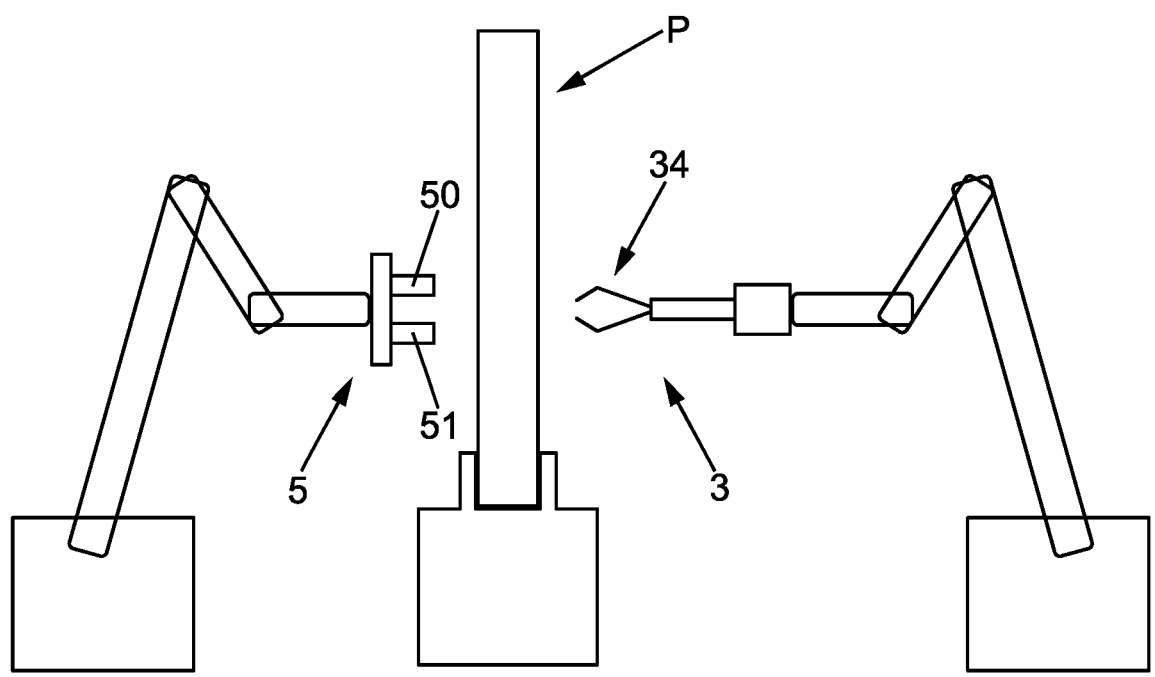
FIG. 19 is a schematic view of a robotic installation suitable for implementing the reinforcement method and which comprises a panel support, the robotic means comprising, disposed on either side of the panel support, a first robotic arm handling the insertion tool, and a second robotic arm, handling the two clamps of the holding mechanism.

According to the composite panel manufacturing method, two skins 17, 18 are added against both sides of the panel P, the internal face of each skin facing the panel P in contact with the protruding/flush parts of the reinforcing elements 1, and as illustrated in FIG. 9. The skins can be textile.

According to a first possibility of transformation, (techniques of "vacuum infusion molding", or more simply "infusion") a resin is then injected under vacuum impregnating the skins 17, 18 and the reinforcing elements 1 within the panel, with creation of reinforcing bridges through the bores of the panels, each reinforcing bridge comprising a reinforcing element 1 impregnated with resin, the composite panel being obtained, after polymerization of the resin, with two skins 17, 18 bonded respectively to both sides of the panel, by their internal face, and the presence of reinforcing bridges in the form of the reinforcing element 1 impregnated with resin joining the skins 17, 18 together.

According to a second possibility of transformation, the reinforcing elements and the two skins comprise reinforcing fibers, and thermoplastic fibers and wherein the skin and panel assembly reinforced by the reinforcing elements are heated, until obtaining the thermoplastic fiber fusion, the composite panel being obtained, after solidification by cooling the thermoplastic polymer, with two skins bonded by their internal face respectively to both sides of the panel, and the presence of reinforcing bridges in the form of the reinforcing fibers of the reinforcing elements impregnated with thermoplastic polymer joining the two skins together.

A technique of "Resin Transfer Molding" or RTM is also known for which the resin is injected under high pressure (3 to 10 bars) until the preform is saturated in a closed mold (comprising a mold and a counter-mold), with the use of a press to keep the mold and counter-mold assembly closed.

A distinction can also be made between the technique "called light resin transfer molding" or RTM Light which combines both the injection of the resin under a pressure greater than atmospheric pressure, but however less than or equal to 3 bars in the mold, and placing the mold under vacuum before injection of the resin, typically from 0.2 to 0.3 bars below atmospheric pressure, and which has the advantage of being less expensive in terms of equipment than the conventional RTM method operating at higher injection pressure. In particular, the counter-mold can be semi-rigid, in the shape of a thick membrane, and not necessarily rigid as for a conventional RTM.

The RTM Light finds a particular application for the transformation of low density foam panels such as polyethylene foams from 35 kg/m 3 to 50 kg/m 3 and whose cell structure, which is not very resistant to compression, does not allow a transformation by the technique of infusion because of the too high vacuum.

Thus, and according to this third possible transformation technique, a resin is injected under a pressure greater than atmospheric pressure at the injection points in a mold, the injection pressure less than or equal to 3 bars, the mold maintained under vacuum between 0.2 and 0.3 bar below atmospheric pressure, the resin impregnating the skins 17, 18 and the reinforcing elements 1 within the panel, with creation of reinforcing bridges through the bores of the panels, each reinforcing bridge comprising a reinforcing element 1 impregnated with resin, the composite panel being obtained, after polymerization of the resin, with two skins 17, 18 bonded respectively to both sides of the panel, by their internal face, and the presence of reinforcing bridges in the form of the reinforcing element 1 impregnated with resin joining the skins 17, 18 together.

ADVANTAGES

The reinforcement method is notable and advantageous in that it allows to obtain reinforcing bridges between skins, with reinforcing fiber content greater than 30%, or even 40% by volume, in particular between 40% and 89%, by volume or even between 45% and 89% by volume, or even between 40% and 80%, or even between 45% and 75%, or even between 45% and 70% by volume, namely a significant amount of fibers compared to the polymerized resin of the reinforcing bridges.

The advantage of using a drilling tool comprising a cylindrical body provided at its base with a circular cutting edge is that it ensures:

- the creation of a bore (or hole) of cylindrical geometry, by removing material, generating a drill core internal to the cylindrical body, by minimizing the phenomena of compression of the material of the panel and therefore the internal tensions at the pierced bores,
- the formation of such bores with minimization of internal tensions, without limitation on the diameter of the bore which may be of a diameter much greater than those created by the work of a needle, for example with a diameter greater than or equal to 2.5 mm, or even greater than or equal to 3 mm, or even greater than 4 mm, or even greater than 6 mm, or else greater than or equal to 8 mm, or even greater than or equal to 10 mm, and/or without limitation on the thickness E of the panel which may be comprised between 30 mm and 300 mm, in particular comprised between 50 mm and 200 mm,
- to ensure the creation of a bore with a controlled rectilinear trajectory, minimizing internal stresses, even if the panel material is a multilayer, including different superimposed layers of different materials and of different densities, or else if the panel comprises facing sheets, for example metallic sheets, and even if the drilling angle is not, locally at the drilling point, perpendicular to the surface of the panel to be pierced, or else locally perpendicular to the intermediate surfaces of the different layers of the panel.

Guaranteeing a bore with a controlled cylindrical geometry, minimizing internal tensions, then allows to insert the reinforcing element, which is in particular fibrous, according to step d) with a controlled lining, in particular a controlled section of the reinforcing element, but without excess so as not to lose the cylindrical geometry giving the final shape of the reinforcement bridges during the application of the resin.

In the end, the method for manufacturing the composite panel allows to obtain a composite panel comprising two skins bonded by their internal face respectively to both sides of the panel P, and the presence of reinforcing bridges in the form of the reinforcing fibers of the reinforcing elements impregnated with resin joining the two skins together; said composite panel having the following features:

- a thickness E of the panel (excluding skins) comprised between 30 mm and 300 mm, in particular comprised between 50 mm and 200 mm,
- cylindrical reinforcing bridges with a diameter comprised between 2.5 mm and 12.5 mm, for example between 4 mm and 12.5 mm,
- a reinforcing fiber content in the reinforcing bridges comprised between 30% and 80% by volume, in particular between 45% and 70%.

In particular, said panel (excluding the skin) may be a multilayer of different densities and/or of different materials and/or having metal facing sheets Par1, Par2.

Advantageously, the possibility of providing reinforcing bridges with a consequent diameter, for example greater than 3 mm, or even 5 mm, 7 mm, 8 mm or even 9 mm allows to reduce the surface density of the number of reinforcing bridges, but also to provide such reinforcements in panels of significant thickness.

EXAMPLES

Three examples of composite panels are detailed below with three different materials for the panel.

These three examples, however, have the following common features:

- They are obtained by the vacuum infusion molding technique, with a vacuum of the order of 0.9 bar below atmospheric pressure and the use of an epoxy resin,
- The two skins are made of a 0/90° bidirectional woven roving glass sheet,
- the core material—the panel—is in a closed cell foam of thickness E equal to 50 mm,
- the yarns of the reinforcing elements are made of glass fibers, each thread has a count of 300 Tex.

Example 1 Acrylic core material (PMI) reinforced by the method presented according to different coring diameters and the bores of which were lined according to different filling rates.

TABLE 2

| Ø Ext (mm) | Line N° | Nb of yarns | Reinforcement bridge n° 1 | | Reinforcement bridge n° 2 | | Diameter | | Fiber content | | |
|---|---|---|---|---|---|---|---|---|---|---|---|
| | | | Ø (mm) | Fiber content (% m) | Ø (mm) | Fiber content (% m) | Avg (mm) | Standard deviation | Avg (% m) | Standard deviation | Avg (% Vf) |
| 4 | 1 | 40 | 4 | 63.8 | 4.03 | 66.5 | 4.02 | 0.02 | 65.1 | 1.9 | 45.8 |
| | 2 | 48 | 4.02 | 70.6 | 4.01 | 72.5 | 4.02 | 0.01 | 71.6 | 1.3 | 53.2 |

TABLE 2-continued

| Ø Ext (mm) | Line N° | Nb of yarns | Reinforcement bridge n° 1 | | Reinforcement bridge n° 2 | | Diameter | | Fiber content | | |
|---|---|---|---|---|---|---|---|---|---|---|---|
| | | | Ø (mm) | Fiber content (% m) | Ø (mm) | Fiber content (% m) | Avg (mm) | Standard deviation | Avg (% m) | Standard deviation | Avg (% Vf) |
| | 3 | 56 | 4.12 | 73.5 | 3.97 | 77.3 | 4.05 | 0.11 | 75.4 | 2.6 | 58.1 |
| 6 | 4 | 100 | 6.02 | 68.9 | 5.86 | 72.2 | 5.94 | 0.11 | 70.5 | 2.3 | 52 |
| | 5 | 120 | 6.06 | 74.9 | 5.85 | 77.5 | 5.96 | 0.15 | 76.2 | 1.8 | 59.1 |
| | 6 | 130 | 6.16 | 76.3 | 5.86 | 80.0 | 6.01 | 0.21 | 78.1 | 2.6 | 61.8 |
| 10 | 7 | 280 | 10.01 | 71.3 | 9.93 | 73.4 | 9.97 | 0.06 | 72.4 | 1.5 | 54.2 |
| | 8 | 320 | 10.1 | 75.2 | 10.05 | 76.7 | 10.08 | 0.04 | 75.9 | 1.1 | 58.8 |
| | 9 | 360 | 10.06 | 78 | 9.98 | 79.4 | 10.02 | 0.06 | 78.7 | 1 | 62.5 |

Different tests are carried out on the same 50 mm thick acrylic foam panel which is reinforced along nine lines of reinforcement, and as presented in Table 2 and, according to a protocol described below:

The panel is flat and the drilling axes of the bores and the insertion axes of the reinforcing elements are perpendicular to the plane of the panel.

Each line N° 1 to N° 9 of Table 2 provides for the insertion of two reinforcing elements (per line), according to the reinforcement method according to the present disclosure. The loop formed at the end of the insertion step d) is cut dividing the reinforcing element into two length sections, projecting from the panel on both sides At each line (N° 1 to N° 9), the pair of parameters external diameter (Ø Ext) of the drilling tool/number of yarns varies. It should be noted that the number of yarns mentioned in the table is here twice the number of yarns of the reinforcing element when it is positioned in step b), that is to say the number of yarns in the bore after folding the reinforcing element in the bore drilled in the panel at the end of step d).

Two skins composed of a 0/90° bidirectional woven roving glass sheet are added against the two faces of the reinforced panel, then the reinforced panel/skin assembly is subjected to a transformation according to the method for obtaining a composite panel implementing the vacuum infusion molding technique. The vacuum is a vacuum of 0.9 bar below atmospheric pressure and which allows migration of the epoxy resin impregnating the skins, but also the reinforcing yarns within the drilled bores. The measurements of the reinforcing bridges are carried out after polymerization of the epoxy resin.

For each line N° 1 to N° 9, two reinforcing bridges are obtained ("Reinforcing bridge N° 1" and "Reinforcing bridge N° 2") in the shape of yarns impregnated with resin of generally cylindrical section.

The measurement of the diameter of the reinforcing bridges (reinforcing bridge N° 1 and reinforcing bridge N° 2) is obtained using a caliper, after having stripped the acrylic foam of the panel around the reinforcement bridges being measured.

The fiber content in the reinforcing bridge (% m) is determined essentially according to the calcination method disclosed by NF EN ISO 1172—Determination of the textile glass and mineral filler content—Calcination methods" presented below.

The table in FIG. 2 thus presents the fiber content (in % by mass).

The conversion of the fiber mass content (% m) contained in the reinforcing bridge into a fiber volume content ($V_{fiber}$) can be easily obtained by the following formula $$V_{fiber} = \frac{1}{1 + \frac{\rho_{fibers}}{\rho_{resin}} \times \frac{1 - \% \, m/100}{\% \, m/100}} \times 100 \quad \text{[Math. 1]}$$

With $\rho_{fibers}$ here equal to 2500 kg/m 3 and $\beta_{resin}$ equal to 1130 kg/m³.

Example 2 Polyurethane (PUR) core material reinforced by the method presented according to different coring diameters and the bores of which were lined according to different filling rates.

TABLE 3

| Ø Ext (mm) | Line N° | Nb of yarns | Reinforcement bridge n° 1 | | Reinforcement bridge n° 2 | | Diameter | | Fiber content | | |
|---|---|---|---|---|---|---|---|---|---|---|---|
| | | | Ø (mm) | Fiber content (% m) | Ø (mm) | Fiber content (% m) | Avg (mm) | Standard deviation | Avg (% m) | Standard deviation | Avg (% Vf) |
| 4 | 1 | 36 | 3.19 | 74.2 | 3.21 | 74.5 | 3.2 | 0.01 | 74.3 | 0.2 | 56.7 |
| | 2 | 44 | 3.23 | 79.2 | 3.27 | 78.8 | 3.25 | 0.03 | 79. | 0.3 | 63.0 |
| | 3 | 28 | 3.12 | 69.2 | 3.12 | 73.2 | 3.12 | 0 | 71.2 | 2.8 | 52.8 |
| 6 | 4 | 60 | 4.92 | 69.9 | 4.93 | 73.8 | 4.93 | 0.01 | 71.9 | 2.8 | 53.6 |
| | 5 | 70 | 4.92 | 75.5 | 4.92 | 71.8 | 4.92 | 0 | 73.7 | 2.6 | 55.9 |
| | 6 | 80 | 5 | 76.1 | 5.03 | 74.5 | 5.02 | 0.02 | 75.3 | 1.1 | 58.0 |
| 10 | 7 | 220 | 8.59 | 74.8 | 8.87 | 75.9 | 8.73 | 0.2 | 75.4 | 0.8 | 58.1 |
| | 8 | 260 | 9.02 | 77.0 | 8.91 | 76.8 | 8.97 | 0.08 | 76.9 | 0.1 | 60.1 |
| | 9 | 270 | 9.04 | 75.9 | *9.03 | 76.0 | 9.04 | 0.01 | 75.9 | 0.1 | 58.8 |

Table 3 shows the results when the panel is a closed cell polyurethane foam, and according to the same protocol as in Example 1

The conversion of the fiber mass content (% m) contained in the reinforcing bridge into a fiber volume content ($V_{fiber}$) can be easily obtained by the formula of Example 1 with the same values of volume densities $\rho_{fibers}$ and $\rho_{resin}$.

Example 3 Polyethylene (PE) core material reinforced by the method presented according to different coring diameters and the bores of which were lined according to different filling rates.

TABLE 4

| Ø Ext (mm) | Line N° | Nb of yarns | Reinforcement bridge n° 1 | | Reinforcement bridge n° 2 | | Diameter | | Fiber content | | |
|---|---|---|---|---|---|---|---|---|---|---|---|
| | | | Ø (mm) | Fiber content (% m) | Ø (mm) | Fiber content (% m) | Avg (mm) | Standard deviation | Avg (% m) | Standard deviation | Avg (% Vf) |
| 4 | 1 | 20 | 2.47 | 74.5 | 2.51 | 72.9 | 2.49 | 0.03 | 73.7 | 1.1 | 55.9 |
| | 2 | 28 | 2.96 | 75.6 | 2.81 | 76.7 | 2.89 | 0.11 | 76.1 | 0.7 | 59.1 |
| | 3 | 40 | 3.07 | 80.5 | 3.15 | 81.2 | 3.11 | 0.06 | 80.9 | 0.5 | 65.6 |
| 6 | 4 | 70 | 4.52 | 74.5 | 4.78 | 71.5 | 4.65 | 0.18 | 73. | 2.1 | 55.0 |
| | 5 | 100 | 5.18 | 70.4 | 5.12 | 78.3 | 5.15 | 0.04 | 74.4 | 5.6 | 56.7 |
| | 6 | 120 | 5.27 | 82.7 | 5.31 | 82.3 | 5.29 | 0.03 | 82.5 | 0.3 | 68 |
| 10 | 7 | 220 | 8.45 | 72.2 | 8.41 | 74.2 | 8.43 | 0.03 | 73.2 | 1.4 | 55.2 |
| | 8 | 240 | 8.5 | 78.1 | 8.47 | 76.6 | 8.49 | 0.02 | 77.4 | 1.1 | 60.7 |
| | 9 | 260 | 8.57 | 77.5 | 8.55 | 78.2 | 8.56 | 0.01 | 77.8 | 0.5 | 61.4 |

Table 4 shows the results when the panel is a closed cell polyethylene foam, and according to the same protocol as in Example 1.

The conversion of the fiber mass content (% m) contained in the reinforcing bridge into a fiber volume content ($V_{fiber}$) can be easily obtained by the formula of Example 1 with the same values of volume densities $\rho_{fibers}$ and $\rho_{resin}$.

Measurements

With regard to reinforcements based on glass fibers, the method for determining the content of fibers contained in the reinforcements is the calcination method presented in standard NF EN ISO 1172—Determination of the textile glass and mineral filler content—Calcination methods. This method was used to determine % m in the examples 1 to 3.

The principle of the method is based on a mass difference between the mass of the complete composite reinforcement (glass fibers+thermosetting or thermoplastic matrix) and the mass of glass fibers of this same sample from which the matrix was removed by calcination.

The crucible or other receptacle which will receive the composite reinforcement is subjected to the temperature selected for calcination for a period of 10 minutes then, once cooled to room temperature, its mass is measured. The operation is repeated until a constant mass is obtained for the crucible.

The composite reinforcement is placed in the previously prepared crucible and the assembly is dried at 105° C. until a constant mass is obtained. The mass of the assembly (crucible+composite reinforcement) is measured once the sample has returned to room temperature.

The assembly is then placed in an oven having a temperature of 625° C. or else comprised between 500° C. and 600° C. for materials (fibers or fillers) not supporting the first temperature set point in order to calcine the composite reinforcement and to recover only the present reinforcing fibers. The sample is kept in the tank until a constant mass is obtained.

As specified in the standard, when the materials are subjected to the test regularly, it is allowed to define a minimum time of calcination and drying to be certain that the constant mass is obtained. In the case of these tests, the oven temperature is 625° C. for a period of 3 hours.

The mass of the assembly (crucible+remaining fibers) is measured once at room temperature.

The content of glass fibers in % of initial mass (% m) is calculated directly by the following formula:

$$\% \, m = \frac{m_3 - m_1}{m_2 - m_1} \times 100 \qquad \text{[Math 2]}$$

With:
 $m_1$ is the initial mass, in grams, of the crucible
 $m_2$ is the total initial mass, in grams, of the dried crucible and dried reinforcement assembly before calcination,
 $m_3$ is the total final mass, in grams, of the crucible and of the residue after calcination.

The standard also specifies that a sample must weigh between 2 and 10 g for composite laminates, which is not always possible for small diameter reinforcing bridges for examples 1 to 3. Also, and in examples 1 to 3, the measurements are to be carried out on a minimum of 2 samples (the most identical possible "reinforcement bridge N° 1" and "reinforcement bridge N° 2"). The result is an average of the two tests provided that the difference between the two measurements is less than 5%. If necessary, a third measurement is carried out on a 3$^{rd}$ sample most similar to the first two and the average of the 3 measurements is kept.

Regarding the reinforcements made from carbon fibers or other reinforcing fibers which do not support calcination (degradation of the fibers related to exposure to temperature), another method by dissolving the matrix and settling must be used as presented in standard NF EN ISO 11667—Determination of resin, reinforcing fiber and mineral filler content—Dissolution methods.

The conversion of the fiber mass content contained in the reinforcements into a fiber volume content involves the densities of the matrix, of the reinforcing fibers and optionally of the composite (fiber+matrix).

The densities of the components are either provided by the supplier of the raw material or are determined by the most suitable measuring means to quantify the volume of the element (Weighing with immersion in a solvent, determining the volume by use a pycnometer or gas pycnometer (helium pycnometer)). The mass of the element can moreover be obtained by weighing.

The relationships between the mass and volume fractions of each of the constituents of the composite material are known to the person skilled in the art and lead to the expression of the volume fraction of fibers in the reinforcement in % by the formula [Math 1] given in Example 1.

The invention claimed is:

1. A method for reinforcing a panel, flat or preformed in three dimensions, according to its thickness:
   - a step a) of providing a reinforcing element which is elongated, flexible, with two longitudinal ends having a length strictly greater than or equal to twice the thickness of the panel at the point of insertion,
   - a step b) of positioning and holding said reinforcing element on one side of the panel, called the insertion side
   - a step c) of gripping the reinforcing element, on the insertion side in an intermediate position between the two longitudinal ends of the reinforcing element,
   - an insertion step d) wherein said reinforcing element gripped in the intermediate position is pulled through a bore passing through the panel, by folding the reinforcing element back on itself, and to a final position wherein the two longitudinal ends project from the bore on the insertion side or else are flush with the wall of the panel on the insertion side, a loop of the reinforcing element projecting from the bore on the side of the panel opposite to the insertion side, or else being provided in a position in the vicinity of the outer wall of the panel on the side of the panel opposite to the insertion side configured so that a section of the loop divides the reinforcing element into two length sections each extending through the bore, positioning the ends of the two length sections flush with the outer wall of the panel on the side opposite to the insertion side, and
   - wherein the reinforcement method has a step of forming the bore, prior to the insertion step d), wherein said bore is drilled into the panel by means of a drilling tool comprising a cylindrical body provided at its base with a circular cutting edge, and wherein the bore is formed by a movement combining an advance along the axis of the cylindrical body and a rotation around the axis of the cylindrical body, generating a drill core resulting from the drilling of the bore, internal to the cylindrical body.

2. The method for reinforcing a panel according to claim 1, wherein step d) of insertion is carried out by the use of an insertion tool which comprises a rod configured to pass through the bore of the panel from the side opposite to the insertion side and in the direction of the insertion side, said rod being provided with a hook at its distal end protruding from the insertion side when the hook grips the reinforcing element in step c), the insertion step d) ensuring the formation of the loop around the hook when the hook is driven along the axis of the bore, from the insertion side to the side of the panel opposite to that of insertion.

3. The method for reinforcing a panel according to claim 1, having a cutting step e) successively to the insertion step d), wherein the loop of the reinforcing element is sectioned in the final position of the reinforcing element, dividing the reinforcing element into two length sections, each extending through the bore, the two ends of each length section being provided projecting from both sides of the panel, or else flush with both sides of the panel, or else projecting from one side of the panel and flush with the other side of the panel.

4. The method for reinforcing a panel according to claim 2, having a cutting step e) successively to the insertion step d), wherein the loop of the reinforcing element is sectioned in the final position of the reinforcing element, dividing the reinforcing element into two length sections, each extending through the bore, the two ends of each length section being provided projecting from both sides of the panel, or else flush with both sides of the panel, or else projecting from one side of the panel and flush with the other side of the panel, and
   wherein the cutting step e) is carried out by said insertion tool which comprises a blade mounted on the insertion tool movable relative to the hook, and wherein the loop is sectioned during step e) by means of an actuating mechanism configured to switch said blade from a retracted position at a distance from the hook, to a cutting position wherein said blade sections the loop of the reinforcing element resting on the hook, with a shearing effect between the blade and the hook.

5. The method for reinforcing a panel according to claim 2, wherein the insertion tool comprising the rod and the hook, but also a tube, the rod and hook assembly being slidably mounted in the tube, said hook being provided protruding from the mouth of the tube when gripping the reinforcing element in step c), and wherein the hook is retracted within the tube, when the hook is driven along the axis of the bore, from the insertion side to the side of the panel opposite to that of insertion during the insertion step d).

6. The method for reinforcing a panel according to claim 1, wherein the reinforcing element is a set of yarns, extending lengthwise over the length L of the reinforcing element, said yarns being juxtaposed.

7. The method for reinforcing a panel according to claim 1, wherein the insertion step d) is carried out by the use of an insertion tool which comprises a rod configured to pass through the bore of the panel from the side opposite to the insertion side and in the direction of the insertion side, said rod being provided with a controlled clamp at its distal end protruding from the insertion side when the controlled clamp grips the reinforcing element in step c), the controlled clamp comprising two jaws configured to switch from an open position allowing the positioning of the reinforcing element between the two jaws to a closed position wherein the two jaws close on the reinforcing element by grasping it, the insertion step d) ensuring the formation of the loop around the controlled clamp when the clamp is driven along the axis of the bore, from the insertion side to the side of the panel opposite to that of insertion.

8. The method for reinforcing a panel according to claim 7, wherein the insertion tool comprising the rod and the clamp but also a tube, the rod and controlled clamp assembly being slidably mounted in the tube, said controlled clamp being provided protruding from the mouth of the tube when gripping the reinforcing element in step c), and wherein the controlled clamp is retracted within the tube, when the controlled clamp is driven along the axis of the bore, from the insertion side to the side of the panel opposite to that of insertion during the insertion step d).

9. The method for reinforcing a panel according to claim 8, wherein the two jaws of the controlled clamp are formed by elastically deformable elements which, when protruding from the mouth of the tube, force the jaws, thanks to the elasticity of the elastically deformable elements, in the open position where the jaws extend radially beyond the internal radius of the tube, the insertion tool being configured such that switching the jaws from the open position to the closed position is caused during the retraction of the clamp within the tube during which the two jaws are forced by the tube to be closed on each other during the sliding of the rod within the tube.

10. The method for reinforcing a panel according to claim 8, having a cutting step e) successively to the insertion step d), wherein the loop of the reinforcing element is sectioned in the final position of the reinforcing element, dividing the reinforcing element into two length sections, each extending through the bore, the two ends of each length section being provided projecting from both sides of the panel, or else flush with both sides of the panel, or else projecting from one side of the panel and flush with the other side of the panel, and wherein the cutting step e) is carried out by said insertion tool which comprises a blade mounted in the tube, movable relative to the clamp, and wherein the loop is sectioned during step e) by means of an actuating mechanism configured to switch said blade from a retracted position at a distance from the clamp within the tube in the closed position of the jaws, to a cutting position wherein said blade sections the loop of the reinforcing element engaged with the clamp within the tube, with a shearing effect between the blade and the clamp.

11. The method for reinforcing a panel according to claim 10, wherein the blade is slidably arranged in an intermediate position between the two jaws, configured to section the loop of the reinforcing element along a cutting plane interposed between the two jaws of the clamp then in the closed position.

12. The method for reinforcing a panel according to claim 2, having a cutting step e) successively to the insertion step d), wherein the loop of the reinforcing element is sectioned in the final position of the reinforcing element, dividing the reinforcing element into two length sections, each extending through the bore, the two ends of each length section being provided projecting from both sides of the panel, or else flush with both sides of the panel, or else projecting from one side of the panel and flush with the other side of the panel, and wherein step e) is carried out while the loop is positioned protruding from the panel on the side of the panel opposite to the insertion side in the final position of the reinforcing element, by a cutting tool distinct from the insertion tool sectioning the loop along an intermediate cutting plane between the gripper, on the one hand, consisting of the hook or the clamp of the insertion tool, and the wall of the panel, on the other hand, the cut generating scrap formed by the loop fold.

13. The method according to claim 1, wherein the drill core resulting from the drilling of the bore, internal to the cylindrical body, is evacuated by pressurizing the cylindrical body with a gas.

14. The method according to claim 1, wherein said positioning and holding step b) is carried out by means of a holding mechanism comprising two clamps, configured to hold said reinforcing element in two positions, on either side, of the middle of the reinforcing element along its length.

15. The method according to claim 1, wherein the external diameter of the cylindrical body of the drilling tool is comprised between 4 mm and 14 mm and wherein the internal diameter of the cylindrical body is comprised between 3 mm and 12.5 mm.

16. The method according to claim 1, wherein the thickness of the panel is comprised between 30 mm and 300 mm.

17. A method for manufacturing a composite panel implementing the panel reinforcement method according to its thickness according to claim 1, to achieve insertions of reinforcing elements into a panel, each reinforcing element being protruding from both sides of the panel, or else provided flush with both sides of the panel, or else protruding from one side of the panel and flush with the other side of the panel, and wherein two skins are added against both sides of the panel, the internal face of each skin facing the panel in contact with the protruding/flush part(s) of the reinforcing elements, wherein:

a resin is injected under vacuum impregnating the skins and the reinforcing elements within the panel, with creation of reinforcing bridges through the bores of the panels, each reinforcing bridge comprising a reinforcing element impregnated with resin, the composite panel being obtained, after polymerization of the resin, with two skins bonded by their internal face respectively to both sides of the panel, and the presence of reinforcing bridges in the form of the reinforcing element impregnated with resin joining the two skins together, or the reinforcing elements and the two skins comprise reinforcing fibers, and thermoplastic fibers and wherein the skin and panel assembly reinforced by the reinforcing elements is heated, until the thermoplastic fibers melt, the composite panel being obtained, after solidification by cooling the thermoplastic polymer, with two skins bonded by their internal face respectively to both sides of the panel, and the presence of reinforcing bridges in the form of the reinforcing fibers of the reinforcing elements impregnated with thermoplastic polymer joining the two skins together, or a resin is injected under a pressure greater than atmospheric pressure at the injection points in a mold, the injection pressure less than or equal to 3 bars, the mold maintained under vacuum between 0.2 and 0.3 bar below atmospheric pressure, the resin impregnating the skins and the reinforcing elements within the panel, with creation of reinforcing bridges through the bores of the panels, each reinforcing bridge comprising a reinforcing element impregnated with resin, the composite panel being obtained, after polymerization of the resin, with two skins bonded respectively to both sides of the panel, by their internal face, and the presence of reinforcing bridges in the form of the reinforcing element impregnated with resin joining the skins together.

18. The manufacturing method according to claim 17, obtaining reinforcing bridges between skins, with reinforcing fiber content greater than 30% by volume, in particular comprised between 45% and 89% by volume, in particular between 45% and 70% by volume.

19. A composite panel obtained according to the manufacturing method of claim 17, comprising two skins bonded by their internal face respectively to both sides of the panel, and the presence of reinforcing bridges in the form of the reinforcing fibers of the reinforcing elements impregnated with resin joining the two skins together; said composite panel having the following features:
- a thickness E of the panel, excluding skins, comprised between 30 mm and 300 mm, in particular comprised between 50 mm and 300 mm,
- cylindrical reinforcing bridges with a diameter comprised between 2.5 mm and 12.5 mm,
- a reinforcing fiber content in the reinforcing bridges comprised between 30% and 80% by volume, in particular comprised between 45% and 89% by volume, in particular between 45% and 70% by volume.

20. The composite panel according to claim 19, wherein said panel is a multilayer of different densities and/or of different materials and/or having metal facing sheets.

\* \* \* \* \*